US011858814B2

(12) United States Patent
Fischer et al.

(10) Patent No.: US 11,858,814 B2
(45) Date of Patent: Jan. 2, 2024

(54) RETICULATION OF MACROMOLECULES INTO CRYSTALLINE NETWORKS

(71) Applicant: The Regents of the University of California, Oakland, CA (US)

(72) Inventors: Felix Raoul Fischer, Berkeley, CA (US); Gregory Clinton Veber, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 468 days.

(21) Appl. No.: 17/021,612

(22) Filed: Sep. 15, 2020

(65) Prior Publication Data

US 2021/0087064 A1 Mar. 25, 2021

Related U.S. Application Data

(60) Provisional application No. 62/902,960, filed on Sep. 19, 2019.

(51) Int. Cl.
| | |
|---|---|
| *H01B 1/04* | (2006.01) |
| *B82Y 30/00* | (2011.01) |
| *C01B 32/194* | (2017.01) |
| *B82Y 40/00* | (2011.01) |

(52) U.S. Cl.
CPC ............. *C01B 32/194* (2017.08); *H01B 1/04* (2013.01); *B82Y 30/00* (2013.01); *B82Y 40/00* (2013.01); *C01B 2204/04* (2013.01); *C01B 2204/06* (2013.01); *C01P 2002/72* (2013.01); *C01P 2002/77* (2013.01); *C01P 2002/82* (2013.01); *C01P 2002/89* (2013.01); *C01P 2004/02* (2013.01); *C01P 2004/03* (2013.01); *C01P 2004/04* (2013.01)

(58) Field of Classification Search
CPC ............ C01B 2204/04; C01B 2204/06; C01B 32/194; B82Y 30/00; B82Y 40/00; C01P 2002/72; C01P 2002/77; C01P 2002/82; C01P 2002/89; C01P 2004/02; C01P 2004/03; C01P 2004/04; H01B 1/04
USPC ................... 428/220; 423/460; 252/500, 510
See application file for complete search history.

(56) References Cited

U.S. PATENT DOCUMENTS

| | | | |
|---|---|---|---|
| 2010/0047154 A1* | 2/2010 | Lee ........................ | C01B 32/184 423/460 |
| 2019/0352805 A1* | 11/2019 | Zhamu ..................... | D02G 3/16 |
| 2021/0125741 A1* | 4/2021 | Hsiao .................... | C01B 32/182 |

OTHER PUBLICATIONS

Vineesh "The improved electrochemical performance of cross-linked 3D graphene nanoribbon monolith electrodes." Nanoscale, 2015, 7, 6504-6509 (Year: 2015).*
Sun "A Molecular Pillar Approach to Grow Vertical Covalent Organic Framework Nanosheets on Graphene: Hybrid Materials for Energy Storage." Angew. Chem. Int. Ed. 2018, 57, 1034-1038 (Year: 2018).*
Keerthi "Edge Functionalization of Structurally Defined Graphene Nanoribbons for Modulating the Self-Assembled Structures." J. Am. Chem. Soc. 2017, 139, 16454-16457 (Year: 2017).*

(Continued)

*Primary Examiner* — Tri V Nguyen
(74) *Attorney, Agent, or Firm* — Gavrilovich, Dodd & Lindsey LLP

(57) ABSTRACT

The disclosure provides for crystalline graphene nanoribbon-covalent organic frameworks (GNR-COFs) that have a two-dimensional (2D) sheet or film morphology, methods of making thereof, and uses thereof.

12 Claims, 14 Drawing Sheets

(56) References Cited

OTHER PUBLICATIONS

Wang "Synthesis of conjugated covalent organic frameworks/graphene composite for supercapacitor electrodes." RSC Adv., 2015, 5, 27290 (Year: 2015).*
Zheng "The art of two-dimensional soft nanomaterials." Sep. 2019 vol. 62 No. 9: 1145-1193 (Year: 2019).*

* cited by examiner

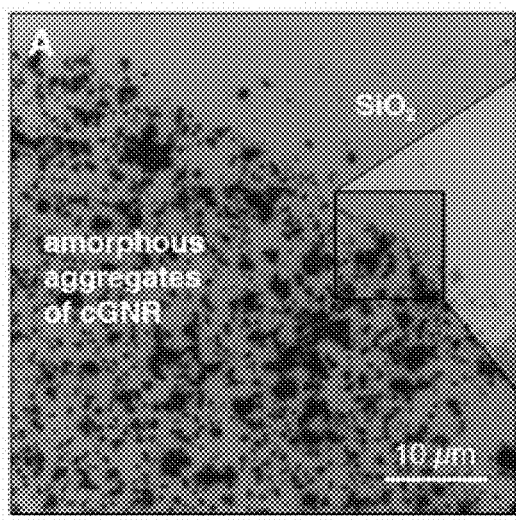
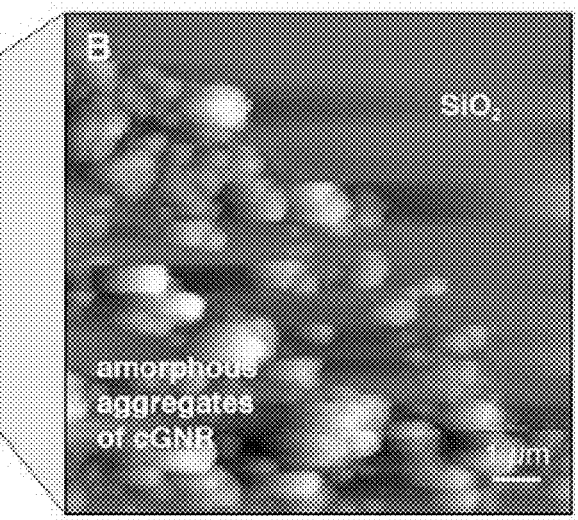
FIG. 6A  FIG. 6B
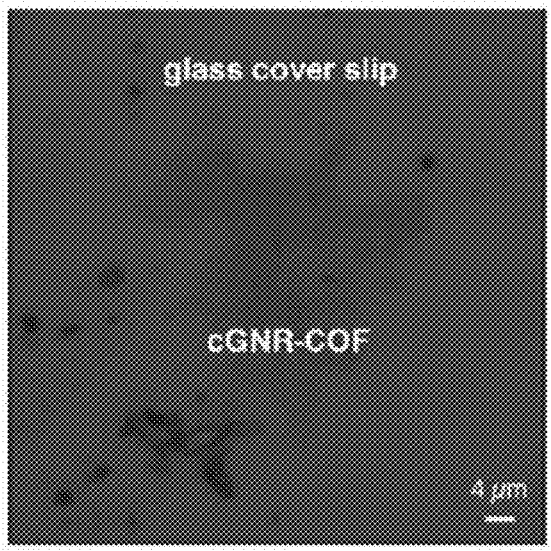
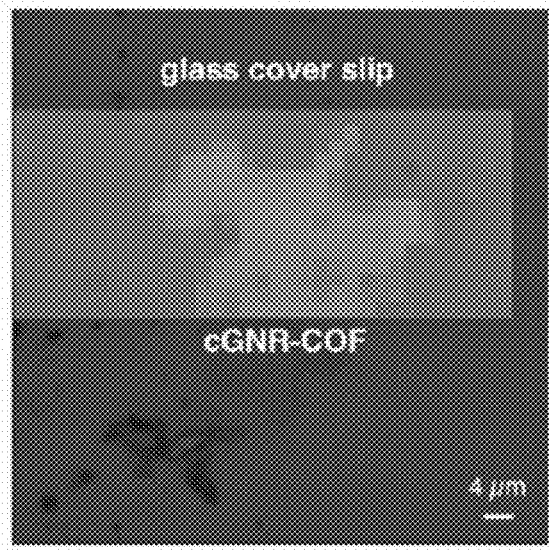
FIG. 7A  FIG. 7B

RETICULATION OF MACROMOLECULES INTO CRYSTALLINE NETWORKS

CROSS REFERENCE TO RELATED APPLICATIONS

This application claims priority under 35 U.S.C. § 119 from Provisional Application Ser. No. 62/902,960, filed Sep. 19, 2019, the disclosures of which are incorporated herein by reference.

STATEMENT OF GOVERNMENT SUPPORT

This invention was made with Government support under Grant No. N00014-16-1-2921, awarded by the Department of Defense, and Grant No. 0939514, awarded by the National Science Foundation. The Government has certain rights in the invention.

TECHNICAL FIELD

The disclosure provides for crystalline graphene nanoribbon-covalent organic frameworks (GNR-COFs) that have a two-dimensional (2D) sheet or film morphology, methods of making thereof, and uses thereof.

BACKGROUND

Covalent organic frameworks (COFs) are 2D or 3D extended periodic networks assembled from symmetric, shape persistent molecular 5 building blocks through strong, directional bonds. Traditional COF growth strategies heavily rely on reversible condensation reactions that guide the reticulation toward a desired thermodynamic equilibrium structure. The requirement for dynamic error correction, however, limits the choice of building blocks and thus the associated mechanical and electronic properties imbued within the periodic lattice of the COF.

SUMMARY

In the studies presented herein, it was demonstrated the growth of crystalline 2D COFs from a polydisperse macromolecule derived from single-layer graphene, bottom-up synthesized quasi one-dimensional (1D) graphene nanoribbons (GNRs). X-ray scattering and transmission electron microscopy revealed that 2D sheets of GNR-COFs self-assembled at a liquid-liquid interface stack parallel to the layer boundary and exhibit an orthotropic crystal packing. Liquid-phase exfoliation of multilayer GNRCOF crystals gave access to large area (>$10^5$ nm$^2$) bilayer and trilayer cGNR-COF films. The functional integration of extended 1D materials into crystalline COFs greatly expands the structural complexity and the scope of mechanical and physical materials properties accessible through a deterministic reticular bottom-up approach. The GNR-COFs disclosed herein can be used for high-performance electronic device architectures and, for the exploration of exotic physical phenomena emerging from deterministically engineered stacks of anisotropic layered 2D materials, as well as, other applications.

In a particular embodiment, the disclosure provides for a crystalline graphene nanoribbon-covalent organic framework (GNR-COF) comprising: a plurality of graphene nanoribbons (GNRs) that are connected or linked together by a plurality of organic linking ligands that comprise functional groups (e.g., [-GNR-L-GNR-L-]$_n$; wherein L is a linking ligand and GNR is a graphene nanoribbon); wherein the GNRs comprise functional groups along the edges of the nanoribbons, and wherein the functional groups of the GNRs form covalent bonds with functional groups of organic linking ligands. In a further embodiment, the GNR-COF has a highly anisotropic crystalline structure. In yet a further embodiment, the GNR-COF has a two-dimensional (2D) sheet or film morphology. In another embodiment, the GNR-COF has a film thickness from 0.5 nm to 50 nm. In yet another embodiment, the GNR-COF has a film thickness from 2 nm to 25 nm. In a particular embodiment, the GNR-COF has been delaminated into bilayer and/or trilayer GNF-COF flakes. In a certain embodiment, the plurality of GNRs comprises atomically precise spaced functional groups along the edges of the nanoribbons. In another embodiment, the plurality of GNRs are connected or linked together via a Schiff base reaction, boronate ester formation reaction, a Knoevenagel reaction, an imide formation reaction, a Michael addition reaction, a phenazine formation reaction, a squaraine formation reaction, or by a benzoxazole formation reaction. In a further embodiment, the plurality of GNRs comprise a structure of:

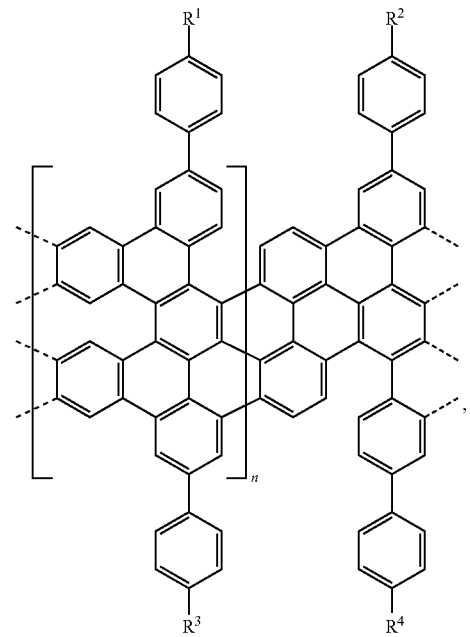

wherein, R$^1$-R$^4$ are each individually selected from —NH$_2$, —CHO, —CN, or —B(OH)$_2$; and n is an integer>100. In a further embodiment, R$^1$-R$^4$ are —NH$_2$ or —CHO. In yet a further embodiment, the plurality of organic linking ligands has a structure selected from:

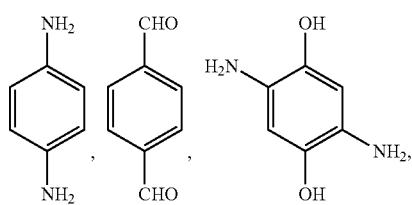

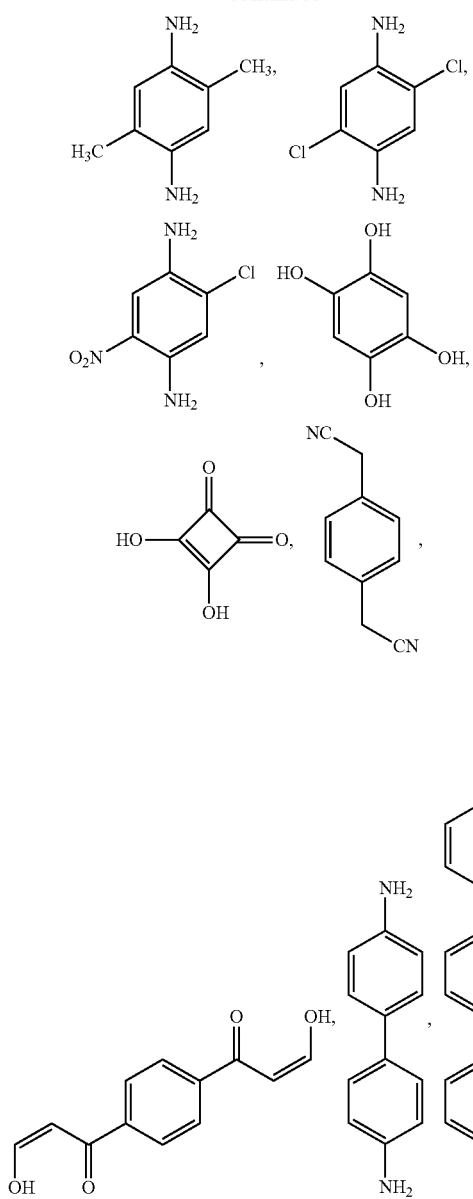
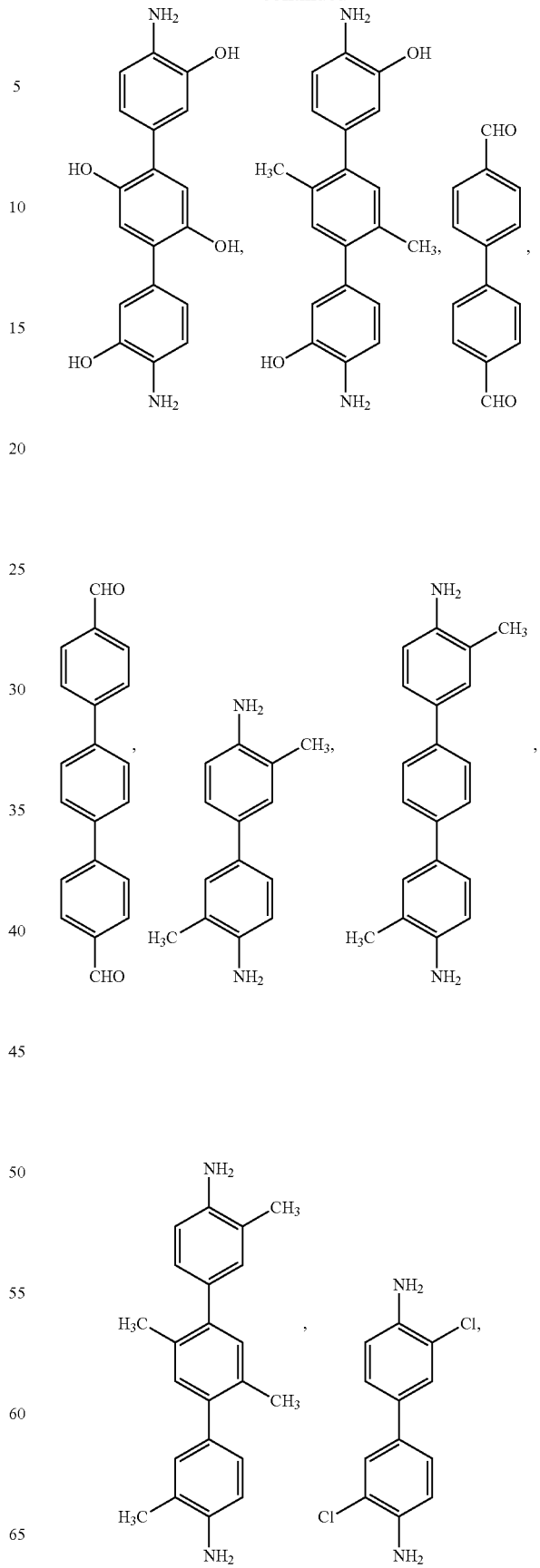

-continued

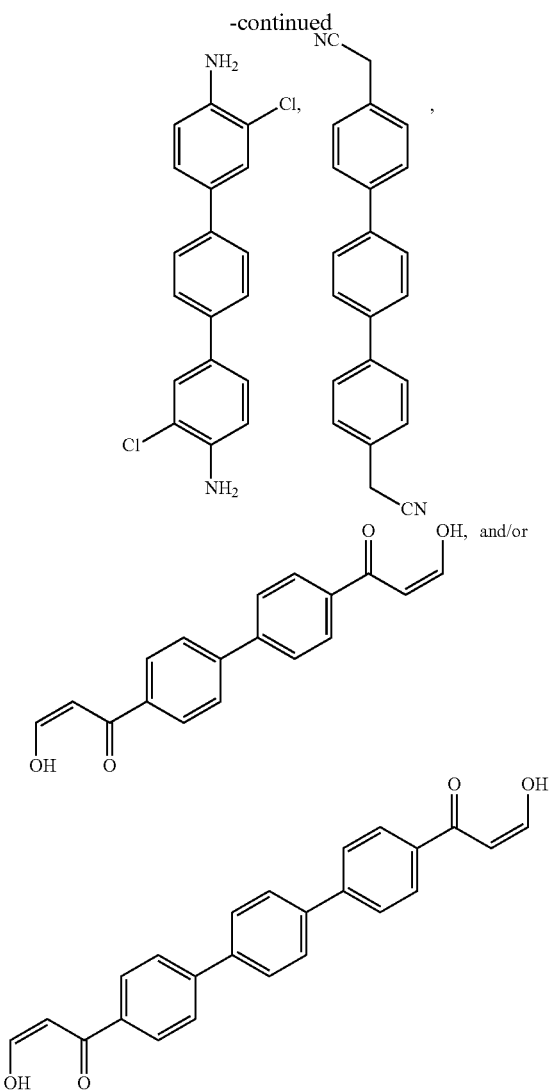

In another embodiment, the plurality of organic linking ligands has the structure of:

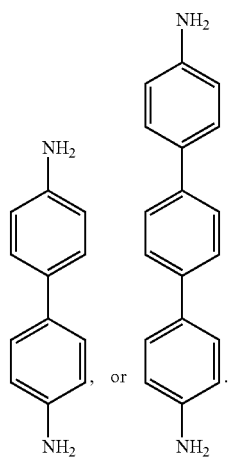 [SMILES: Nc1ccc(-c2ccc(N)cc2)cc1 ; Nc1ccc(-c2ccc(-c3ccc(N)cc3)cc2)cc1]

In a certain embodiment, the disclosure also provides a method of making the crystalline GNR-COF of any one of the preceding claims, comprising: adding a first mixture comprising a Lewis Acid in an aqueous solution, with a second mixture comprising a plurality of graphene nanoribbons (GNRs) and a plurality of organic liking ligands in an organic solvent system; wherein the GNR-COF is formed through interfacial polymerization at the liquid interface between the first mixture and the second mixture. In another embodiment, the plurality of GNRs are functionalized along the edges of the GNR with aldehyde groups, and wherein the organic linking ligands comprise amine functional groups. In yet another embodiment, the plurality of GNRs comprise a structure of:

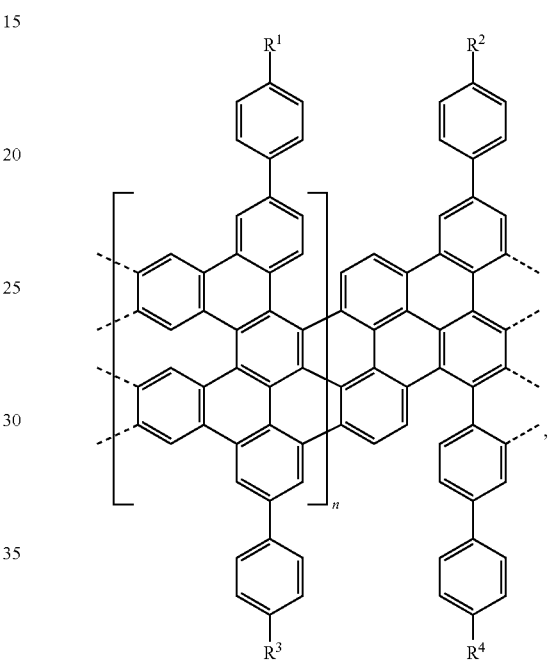

wherein, $R^1$-$R^4$ are each individually selected from —$NH_2$, —CHO, —CN, or —$B(OH)_2$; and n is an integer>100. In a further embodiment, $R^1$-$R^4$ are —$NH_2$ or —CHO. In yet a further embodiment, the plurality of organic linking ligands has a structure selected from:

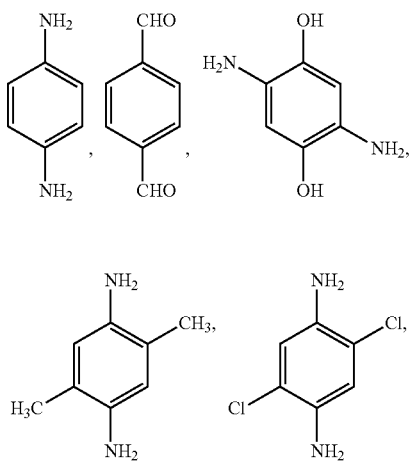

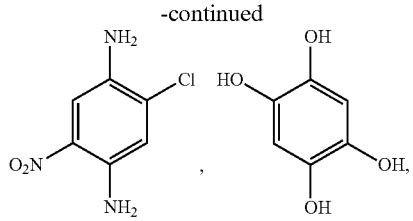
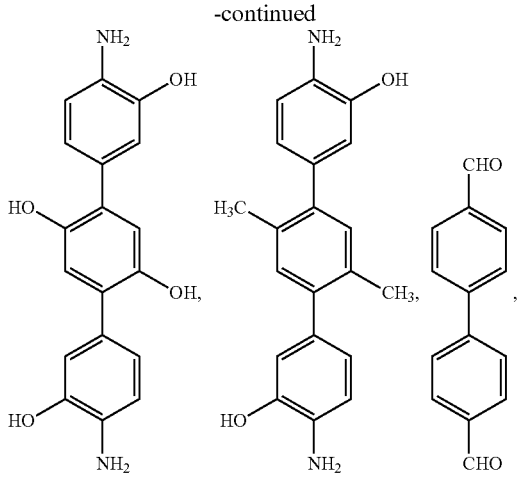
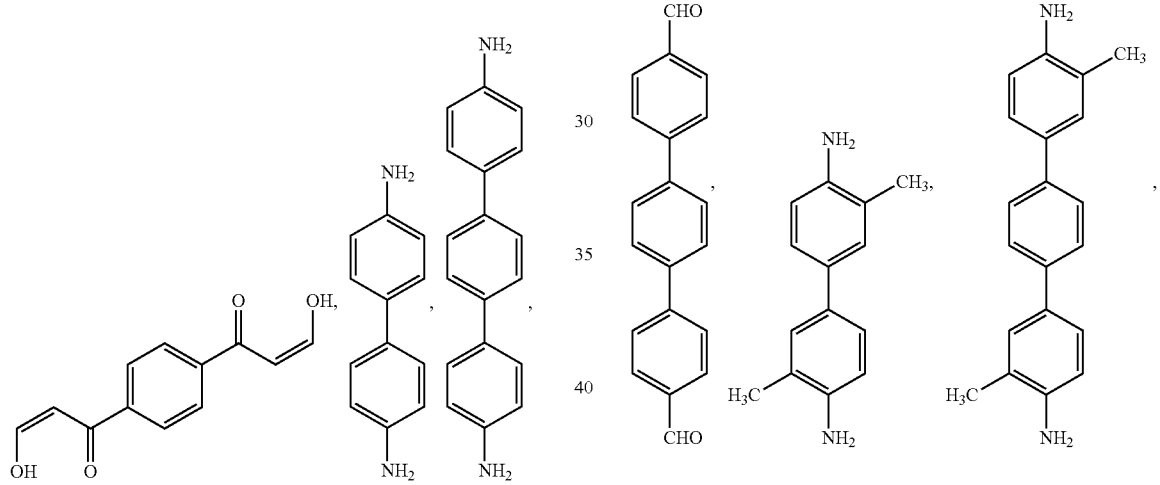
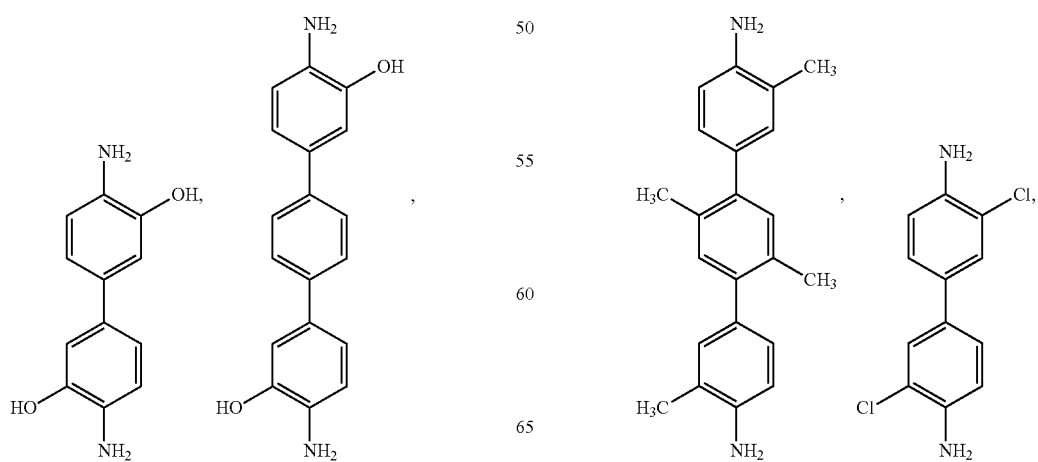

-continued

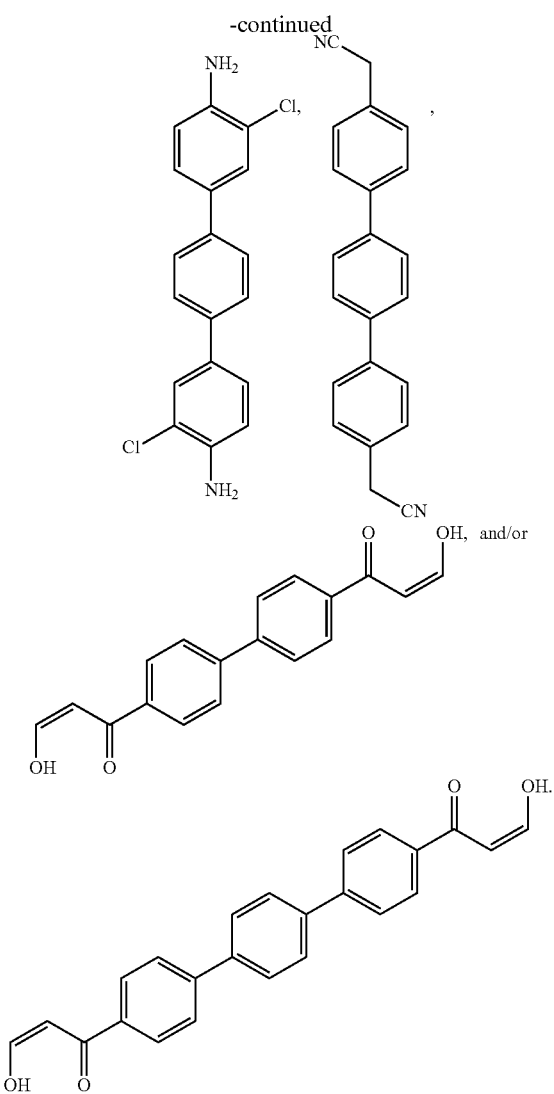

In another embodiment, the plurality of organic linking ligands has a structure of:

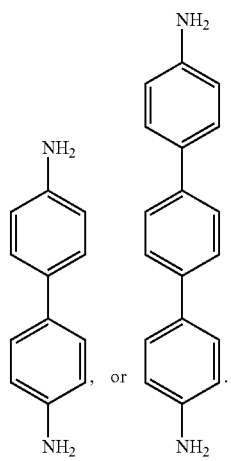 [SMILES: Nc1ccc(-c2ccc(N)cc2)cc1 ; Nc1ccc(-c2ccc(-c3ccc(N)cc3)cc2)cc1]

In yet another embodiment, the organic solvent system comprises 1,2-dicholorbenzene and chloroform. In a further embodiment, the Lewis Acid is scandium(III)triflate. In yet another embodiment, a method disclosed herein further comprises the step of isolating the GNR-COFs formed at the interface between the first mixture and second mixture with a substrate. In a further embodiment, a method disclosed herein further comprises the step of sonicating a suspension comprising GNR-COF in acetone and 1,2-dicholorbenzene to form bilayer and/or trilayer GNF-COF flakes.

The compositions of the disclosure find use in electronic devices including transparent conductors, transistor technology, battery systems, catalyst systems and the like.

The details of one or more embodiments of the disclosure are set forth in the accompanying drawings and the description below. Other features, objects, and advantages will be apparent from the description and drawings, and from the claims.

DESCRIPTION OF DRAWINGS

FIG. 6A-B provides optical microscope images and ambient AFM images of a SiO$_2$ substrate that has been treated with unfunctionalized cGNRs. (A) Optical microscope image of a SiO$_2$ substrate after scooping the liquid-liquid interface of a negative control experiment with unfunctionalized cGNRs (e.g., cGNRs without aldehyde functional groups lining the edges). (B) Ambient AFM image of the same region of the substrate. While the surface is covered with large amorphous cGNR aggregates collecting at the liquid-liquid interface no crystalline film boundary can be observed in the sample.

FIG. 7A-D provides optical microscope images and Raman spectroscopy of CGNR-COF thin films. (A) Optical microscope images of a cGNR-COF thin films on a glass slide. (B) Raman map of G-peak intensity overlaid on the microscope image in A. (C) Optical microscope images of a cGNR-COF thin films on Si/SiO2. (D) Raman map of G-peak intensity overlaid on the microscope image in C.

DETAILED DESCRIPTION

Figure 1A:
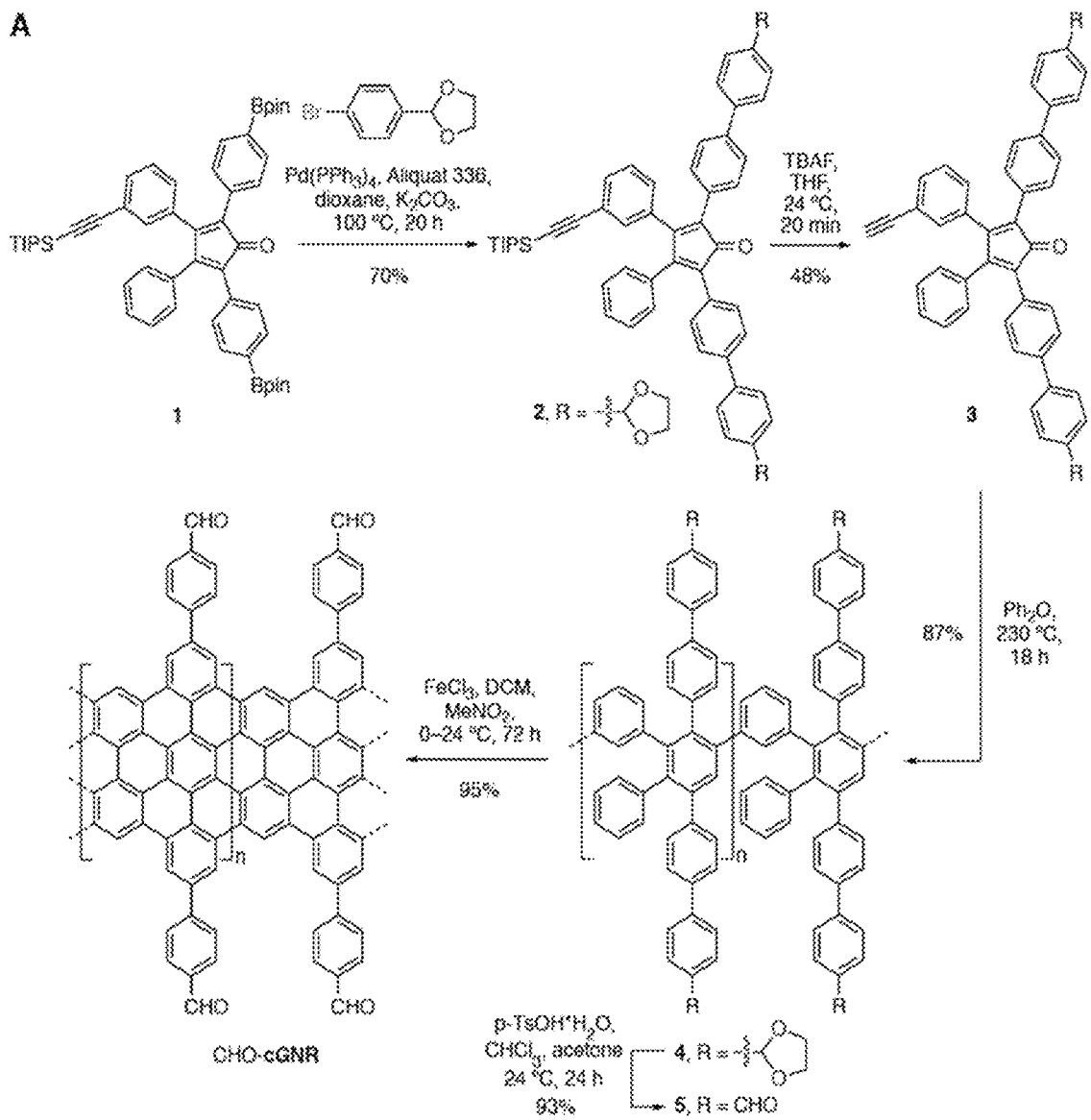
FIG. 1A-E provides for the synthesis and characterization of aldehyde-functionalized CHO-cGNRs. (A) Schematic representation of the synthesis of CHO-cGNR. (B) SEC traces for the linear polymers (red) and cyclic oligomers (blue) of 5. (C) MALDI mass spectrum of crude 4 (black) and 5 (red) showing families of molecular ions separated by the mass of each polymer repeat unit (* corresponds to subfamilies of molecular ions resulting from the loss of acetal protecting groups). (D) Raman spectrum ($\lambda_E$=532 nm) of CHO-cGNRs. Inset shows the characteristic RLBM of cGNRs. (E) FT-IR spectrum of 5 (gray), CHO-cGNRs (black), and cGNR-COF (red) showing the characteristic aldehyde C=O ($\lambda^{-1}$=1699 cm$^{-1}$) and aromatic C=C ($\lambda^{-1}$=1602 cm$^{-1}$) stretching modes in both 5 and CHO-cGNRs. The IR spectrum of cGNR-COF shows a decrease in the intensity of the aldehyde C=O ($\lambda^{-1}$=1702 cm$^{-1}$) relative to the C=C mode (A'=1600 cm$^{-1}$) along with the signal for the C=N imine stretching mode (A'=1657 cm$^{-1}$).

As used herein and in the appended claims, the singular forms "a," "an," and "the" include plural referents unless the context clearly dictates otherwise. Thus, for example, reference to "a vector" includes a plurality of such vectors and reference to "the amino acid" includes reference to one or more amino acids and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although many methods and reagents are similar or equivalent to those described herein, the exemplary methods and materials are disclosed herein.

All publications mentioned herein are incorporated herein by reference in full for the purpose of describing and disclosing the methodologies, which might be used in connection with the description herein. Moreover, with respect to any term that is presented in one or more publications that is similar to, or identical with, a term that has been expressly defined in this disclosure, the definition of the term as expressly provided in this disclosure will control in all respects.

The reticular synthesis of covalent organic frameworks (COFs), extended porous two-dimensional (2D) or three-dimensional (3D) networks held together by strong, highly directional chemical bonds, has thus far been restricted to small, shape-persistent, molecular building blocks. Traditional COF growth strategies heavily rely on reversible condensation reactions that guide the reticulation toward a desired thermodynamic equilibrium structure. The requirement for dynamic error correction, however, limits the choice of building blocks and thus the associated mechanical and electronic properties imbued within the periodic lattice of the COF. Furthermore, the poor electronic communication across imine and boronate ester linkers, most commonly used in the synthesis of 2D COFs, gives rise to semiconducting materials featuring large band gaps undesirable for advanced electronic applications. Charge-carrier transport in these materials is dominated by interlayer hopping mechanisms rather than through chemical bonds between linkers and the constituent molecular building blocks within a 2D sheet. Introduction of conjugated polymers as 1D conduction paths within a single COF sheet could address this shortcoming, yet the incorporation of macromolecules as building units in COFs has not been demonstrated. Recent advances in the bottom-up synthesis of graphene nanoribbons (GNRs), atomically thin quasi one-dimensional (1D) strips of graphene, have inspired the development of a new class of COF building blocks. The control over key structural parameters in GNRs, width, edge symmetry, dopant atom density, and dopant position gives rise to a highly tunable band structure and the emergence of exotic physical phenomena linked to symmetry protected topological states.

As shown in the exemplary studies presented herein, exquisite structural control inherent to bottom-up synthesized GNRs can be adapted to introduce atomically precise spacings of functional groups along the edges of a ribbon, giving access to a shape persistent quasi-1D macromolecular building block for the reticular synthesis of 2D COFs.

The disclosure provides for a crystalline graphene nanoribbon-covalent organic framework (GNR-COF) comprising: GNR linked to another GNR by linking ligands. The linking ligands comprise organic molecules. Functional groups on the linking ligands and on the graphene nanoribbons condense to form bonds. In one embodiment, a plurality of graphene nanoribbons (GNRs) are connected or linked together by a plurality of organic linking ligands that comprise functional groups; wherein the GNRs comprise functional groups along the edges of the nanoribbons, and wherein the functional groups of the GNRs form covalent bonds with functional groups of organic linking ligands. In a further embodiment, a GNR-COF of the disclosure has an anisotropic or highly anisotropic crystalline structure. In yet a further embodiment, a GNR-COF disclosed herein has a two-dimensional (2D) sheet or film morphology. In another embodiment, a GNR-COF disclosed herein has a film thickness of 0.5 nm, 0.75 nm, 1 nm, 1.5 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm, 40 nm, 41 nm, 42 nm, 43 nm, 44 nm, 45 nm, 46 nm, 47 nm, 48 nm, 49 nm, 50 nm, or a range that includes or is between any two of the foregoing thickness (e.g., from 2 nm to 25 nm), including fractional increments thereof.

In a particular embodiment, a GNR-COF of the disclosure has been delaminated into bilayer and/or trilayer GNF-COF flakes. For example, liquid-phase exfoliation of crystalline cGNR-COFs gives access to vertically stacked few layered cGNR-COF flakes for applications in functional materials and advanced electronics.

In a certain embodiment, GNRs used to synthesize a GNR-COF of the disclosure comprises atomically precise spaced functional groups along the edges of the nanoribbons. These functional groups typically participate in formation of covalent bonds between the GNRs and linking ligands. In another embodiment, the plurality of GNRs form covalent bonds with the plurality of organic linking ligands via a reaction commonly used to make COFs, such as a Schiff base reaction, a boronate ester formation reaction, a Knoevenagel reaction, an imide formation reaction, a Michael addition reaction, a phenazine formation reaction, a squaraine formation reaction, or a benzoxazole formation reaction. In a further embodiment, the plurality of GNRs comprise a structure of:

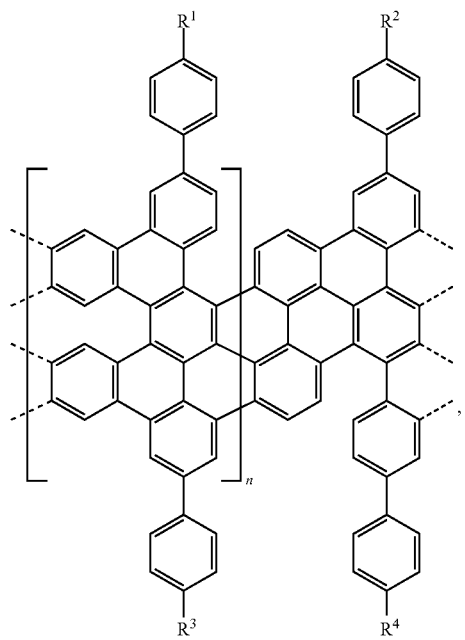

wherein, $R^1$-$R^4$ are each individually selected from —$NH_2$, —CHO, —CN, or —$B(OH)_2$; and n is an integer>100. In a further embodiment, $R^1$-$R^4$ are —$NH_2$ or —CHO.

In yet a certain embodiment, the organic linking ligands used to make up the GNR-COF of the disclosure is an aryl or heteroaryl that comprises functional groups which can participate in covalent bond formation with the functional groups of GNRs disclosed herein. The organic linking ligands can comprised functional groups, like halos, —OH, —$NH_2$, —COH, —CN, Michael addition adducts, —$NO_2$, boronic acid groups, boronate ester groups, etc. In a particular embodiment, a plurality of organic linking ligands disclosed herein has structure selected from:

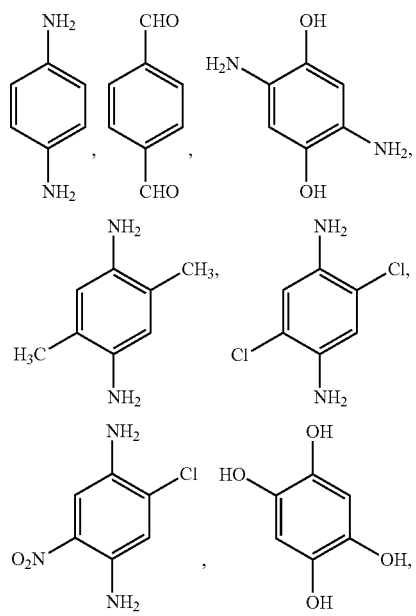

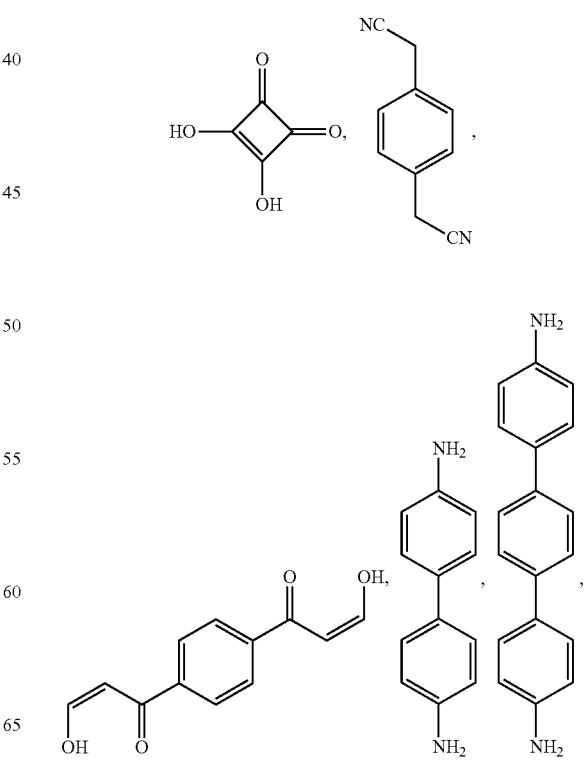

-continued
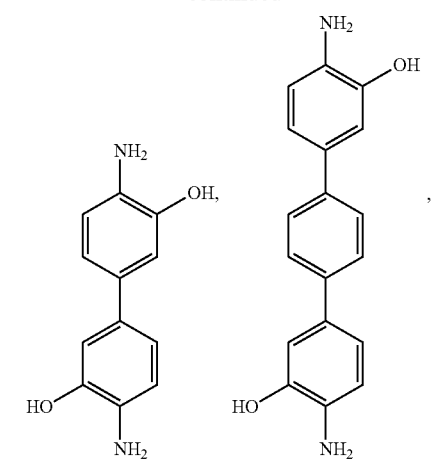
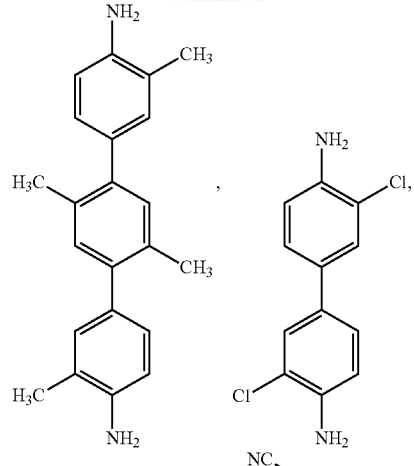
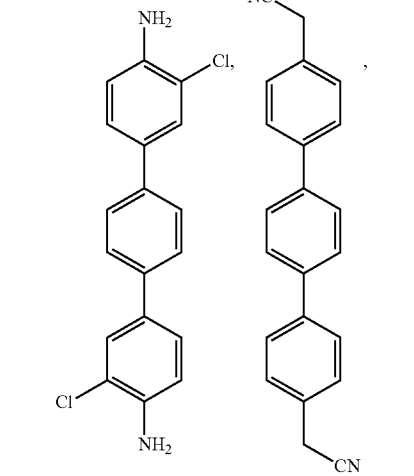
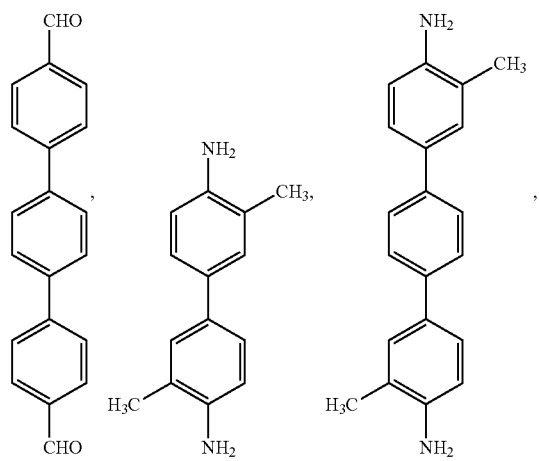
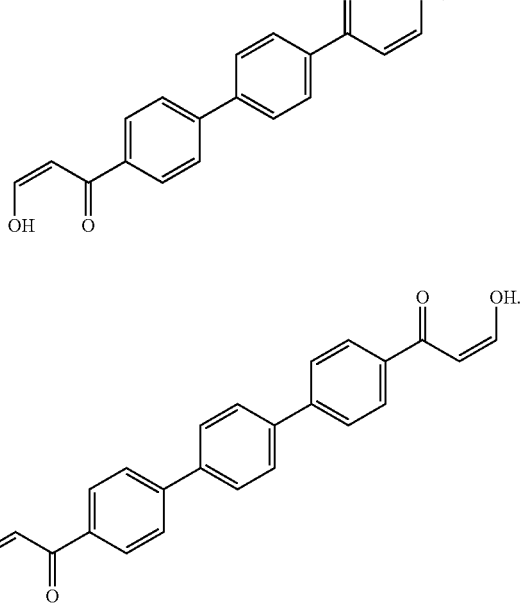
In a particular embodiment, the plurality of organic linking ligands has a structure of:

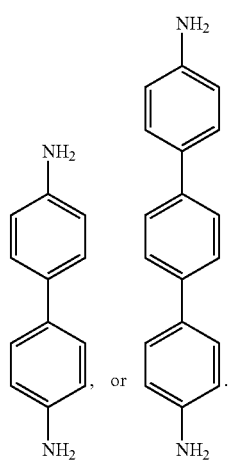 [SMILES: Nc1ccc(-c2ccc(N)cc2)cc1 ; Nc1ccc(-c2ccc(-c3ccc(N)cc3)cc2)cc1]

For example, the disclosure provides, in one embodiment, imine linked GNR-COF films. In particular, large area, homogenous thin, imine linked GNR-COF films of variable thickness can be synthesized using the methods disclosed herein by using interfacial polymerization at a liquid-liquid interface. By modulating the concentration of GNRs in the reaction mixture the film thickness can be controlled over a range of 2-22 nm. Fourier transform infrared (FT-IR) spectroscopy along with control experiments using unfunctionalized cGNRs confirmed that the GNR-COF films are covalently linked through imine bonds. The crystallographic structure of the GNR-COF was probed using wide angle X-ray scattering (WAXS) and transmission electron microscopy (TEM), revealing the extraordinary potential of reticular covalent self-assembly techniques to access densely packed parallel arrays of GNRs.

The disclosure also provides methods for making or synthesizing a GNR-COF disclosed herein. In particular embodiment, the method for making or synthesizing a GNR-COF disclosed herein comprises the steps of: adding a first mixture comprising a Lewis Acid and/or Brønsted acid in an aqueous solution, with a second mixture comprising a plurality of graphene nanoribbons (GNRs) and organic liking ligands in an organic solvent system; wherein the GNR-COF is formed through interfacial polymerization at the liquid interface between the first mixture and the second mixture. In particular, the two mixtures should be carefully added so as to form a noticeable layer between the two immiscible mixtures. The GNR-COFs of the disclosure will form in this layer over a period of days.

As used herein "Brønsted acid" refers to a molecule or ion that is able to lose, or "donate," a hydrogen cation (proton, H+). The term "Brønsted acid" explicitly includes, but is not limited to, hydrochloric acid (HCl), hydrofluoric acid (HF), hydrobromic acid (HBr), hydroiodic acid (HI), phosphoric acid (H3PO4), sulfuric acid (H2SO4), boric acid (B(OH)3), tetrafluoroboric acid (HBF4), perchloric acid (HClO4), acetic acid (CH3C(O)—OH), trifluoroacetic acid (CF3C(O)—OH), methanesulfonic acid (CH3SO3H), solid acid resins containing sulfonic acid sites, and solid acid resins containing benzoic acid sites.

As used herein, the term "Lewis Acid" refers to moiety capable of sharing or accepting an electron pair. Examples of lewis acids include, but are not limited to, $BF_3$-etherates and metal halides, alkoxides, and mixed halide/alkoxides (e.g., Al(Oalkyl)$_2$Cl, Al(Oalkyl)Cl$_2$). The metals can be aluminum, titanium, zirconium, magnesium, copper, zinc, iron, tin, boron, ytterbium, lanthanum, and samarium. Other Lewis Acids are known in the art.

As indicated above the plurality of GNRs are functionalized (e.g., aldehyde groups) along the edges of the GNR so as to be able to form covalent bonds (e.g., imine bonds) with functional groups (e.g., NH$_2$) of the organic linking ligands. A suitable organic solvent system was found to comprise 1,2-dicholorbenzene and chloroform, typically in a 1:1 ratio, although other ratios can be used, e.g., 5:1, 4:1, 3:1, 2:1, 1.5:1, 1:1.5, 1:2, 1:3, 1:4, and 1:5. The Lewis Acid and/or Brønsted acid used in the reaction should be soluble in aqueous solvents and catalyze polymerization of covalent organic framework films (e.g., see Matsumoto et al., *Chem* 4:308-317 (2018)). In a particular embodiment, the Lewis Acid used to form the GNR-COF is scandium(III)triflate (Sc(OTf)$_3$). Scandium(III)triflate is a highly active catalyst for imine-linked COF formation. The GNR-COFs formed at the interface between the mixtures can be scooped out with a substrate (e.g., glass, membranes, etc.). In a further embodiment, a method disclosed herein further comprises the generating of bilayer and/or trilayer GNF-COF flakes by liquid exfoliation. For example, a dispersion of GNR-COF in acetone is added to 1,2-dicholorbenzene and then agitated by use of rocker, sonification, manual shaking, etc. to form bilayer and/or trilayer GNF-COF flakes. The simplicity of the interfacial GNR-COF growth and liquid-phase exfoliation protocol opens the path to accessing densely packed 2D sheets of parallel GNRs for high-performance electronic device architectures and the exploration of exotic physical phenomena emerging from deterministically engineered stacks of anisotropic layered 2D materials. For example, the disclosure further provides that an electronic device, or battery can comprise bilayer and/or trilayer GNF-COF flakes or a GNF-COF of the disclosure.

The following examples are intended to illustrate but not limit the disclosure. While they are typical of those that might be used, other procedures known to those skilled in the art may alternatively be used.

EXAMPLES

Materials and Methods. Unless otherwise stated, all manipulations of air and/or moisture sensitive compounds were carried out in oven-dried glassware, under an atmosphere of $N_2$ or Ar. All solvents and reagents were purchased from Alfa Aesar, Spectrum Chemicals, Acros Organics, TCI America, and Sigma-Aldrich and were used as received unless otherwise noted. Organic solvents were dried by passing through a column of alumina and were degassed by vigorous bubbling of $N_2$ or Ar through the solvent for 20 min. Flash column chromatography was performed on Sili-Cycle silica gel (particle size 40-63 μm). Thin layer chromatography was performed using SiliCycle silica gel 60 Å F-254 precoated plates (0.25 mm thick) and visualized by UV absorption. HOPG substrates were purchased from SPI supplies (3 mm Grade SPI-3).

All $^1$H and $^{13}$C NMR spectra were recorded on Bruker AV-300, AVB-400, AV-600, DRX-500, and AV-500 MHz spectrometers, and are referenced to residual solvent peaks (CDCl$_3$ $^1$H NMR=7.26 ppm, $^{13}$C NMR=77.16 ppm; CD$_2$Cl$_2$ $^1$H NMR=5.32 ppm, $^{13}$C NMR=53.84 ppm). ESI mass spectrometry was performed on a Finnigan LTQFT (Thermo) spectrometer in positive ionization mode. MALDI mass spectrometry was performed on a Voyager-DE PRO (Applied Biosystems Voyager System 6322) in positive mode using a matrix of dithranol.

Gel permeation chromatography (GPC) was carried out on a LC/MS Agilent 1260 Infinity set up with a guard and two Agilent Polypore 300 7.5 mm columns at 35° C. All GPC analyses were performed on a 0.2 mg mL$^{-1}$ solution of polymer in CHCl$_3$. An injection volume of 25 μL and a flow rate of 1 mL min$^{-1}$ were used. Calibration was based on narrow polydispersity polystyrene standards ranging from M$_w$=100 to 4,068,981 au.

Raman spectroscopy was performed on a Horiba Jobin Yvon LabRAM ARAMIS confocal Raman microscope with 532 nm excitation wavelength. Wide-angle X-ray scattering (WAXS) data was acquired on beamline 7.3.3 at the Advanced Light Source with a Pilatus 2M detector.

Powder samples were dropcast from acetone, dried in quartz capillaries and put into a helium atmosphere for measurement in transmission geometry. Silver behenate was used for calibration. The Nika package for IGOR Pro (Wavemerics) was used to reduce the acquired 2D raw data to a 1D profile.

SEM was performed on a Zeiss Gemini Ultra-55 FESEM with an accelerating voltage between 2-10 kV. Low-dose HR-TEM images were acquired on the TEAM I instrument at the National Center for Electron Microscopy at the Molecular Foundry. TEAM I is a FEI Titan-class microscope operated at 300 kV, with geometric aberrations corrected to third order (with partial correction to fifth order) and chromatic aberrations corrected to the first order. Imaging data were collected at 24° C. with the Gatan K2 direct-detection camera operated in electron-counting mode. Images were recorded with total doses of 100 ek$^2$ to minimize sample damage. SEM and TEM samples were prepared via scooping films directly, or drop-casting film dispersions onto lacey carbon TEM grids purchased from Ted Pella.

Infrared spectroscopy was conducted with a Bruker ALPHA ATR-FTIR. ATR-FTIR samples were prepared by scooping thick films directly onto aluminum foil. UV-Vis spectroscopic measurements were conducted on a Varian Cary 50 spectrophotometer.

5-bis(4-bromophenyl)-3-phenyl-4-(3-((triisopropylsilyl) ethynyl)phenyl)cyclopenta-2,4-dien-1-one; 2-(4-bromophenyl)-1,3-dioxolane; and unfunctionalized cGNRs were synthesized following the protocols in Rogers et al. *J. Am. Chem. Soc.* 139:4052-4061 (2017) and Wang et al., *Chem. Commun.* 49:5790 (2013).

3-phenyl-2,5-bis(4-(4,4,5,5-tetramethyl-1,3,2-dioxaborolan-2-yl)phenyl)-4-(3-((triisopropylsilyl) ethynyl)phenyl) cyclopenta-2,4-dien-1-one (1). An oven dried 200 mL Schlenk flask with reflux condenser was charged under N$_2$ with 2,5-bis(4-bromophenyl)-3-phenyl-4-(3((triisopropylsilyl) ethynyl)phenyl)cyclopenta-2,4-dien-1-one (0.50 g, 0.69 mmol), Pd(dppf)Cl$_2$ (91 mg, 0.11 mmol), anhydrous KOAc (0.67 g, 6.80 mmol), and bis(pinacolato)diboron (0.68 g, 2.68 mmol) in anhydrous dioxane (80 mL). The reaction mixture was stirred for 5 h at 95° C. The solvent was removed and the crude product was re-dissolved in CH$_2$Cl$_2$, washed with H$_2$O, saturated aqueous NaCl solution, dried over Na$_2$SO$_4$, and concentrated on a rotary evaporator. The crude product was passed through a plug of silica (EtOAc). The solvent was removed and the solid was sonicated in MeOH. This process was repeated until the MeOH filtrate was colorless, yielding 1 (0.47 g, 0.58 mmol, 84%) as a purple solid. $^1$H NMR (400 MHz, CDCl$_3$, 22° C.) δ=7.67-7.59 (m, 4H), 7.33 (dt, J=7.7, 1.4, 1H), 7.29-7.18 (m, 7H), 7.13 (t, J=7.7, 1H), 6.97-6.90 (m, 4H), 1.31 (m, 24H), 1.05 (m, 21H) ppm; $^{13}$C {$^1$H} NMR (151 MHz, CD$_2$Cl$_2$, 22° C.) δ=200.2, 155.8, 154.6, 134.8, 134.7, 134.2, 134.0, 133.7, 133.6, 133.5, 132.2, 129.9, 129.9, 129.8, 129.7, 129.3, 128.7, 128.6, 126.5, 126.1, 123.8, 106.9, 92.0, 84.4, 25.2, 19.0, 11.8 ppm; HRMS (ESI-TOF) m/z: [C$_{52}$H$_{62}$B$_2$O$_5$Si]$^+$ calcd. [C$_{52}$H$_{62}$B$_2$O$_5$Si] 816.4547; found 816.4523.

2,5-bis(4'-(1,3-dioxolan-2-yl)-[1,1'-biphenyl]-4-yl)-3-phenyl-4-(3-((triisopropylsilyl) ethynyl) phenyl) cyclopenta-2,4-dien-1-one (2). A 25 mL Schlenk flask was charged with 1 (264 mg, 0.32 mmol), 2-(4-bromophenyl)-1,3-dioxolane (2) (224 mg, 0.98 mmol), and Aliquat 336 (6 drops) in 2M K$_2$CO$_3$ (3 mL) and dioxane (6 mL). The suspension was degassed via N$_2$ sparging for 30 min, after which Pd(PPh$_3$)$_4$ (60.4 mg, 0.053 mmol) was added under N$_2$. The reaction mixture was stirred at 100° C. for 20 h under N$_2$. The solution was cooled to 24° C. and diluted with CH$_2$Cl$_2$. The organic phase was washed with H$_2$O, saturated aqueous NaCl solution, dried over Na$_2$SO$_4$, and concentrated on a rotary evaporator. Column chromatography (SiO$_2$; 1-10% EtOAc/CH$_2$Cl$_2$) yielded 2 (189 mg, 0.22 mmol, 68%) as a purple solid. $^1$H NMR (600 MHz, CDCl3, 22° C.) δ=7.64-7.60 (m, 4H), 7.56-7.50 (m, 8H), 7.37-7.33 (m, 5H), 7.31-7.28 (m, 1H), 7.27-7.23 (m, 2H), 7.17 (t, J=7.7, 1H), 7.04-6.98 (m, 4H), 5.81-5.80 (m, 2H), 4.14-4.10 (m, 4H), 4.04-4.01 (m, 4H), 1.06-1.04 (m, 21H) ppm; $^{13}$C {$^1$H} NMR (101 MHz, CD$_2$Cl$_2$, 22° C.) δ=200.7, 155.4, 154.2, 141.8, 141.8, 140.3, 140.1, 138.0, 133.8, 133.6, 133.6, 132.2, 131.1, 130.6, 130.4, 129.9, 129.7, 129.3, 128.7, 128.7, 127.6, 127.5, 127.4, 127.3, 127.3, 127.2, 125.9, 125.5, 123.8, 106.8, 104.0, 92.0, 65.9, 18.9, 11.8 ppm; HRMS (ESI-TOF) m/z: [C$_{58}$H$_{56}$O$_5$Si]$^+$ calcd. [C$_{58}$H$_{56}$O$_5$Si] 860.3892; found 860.3891.

2,5-bis(4'-(1,3-dioxolan-2-yl)-[1,1'-biphenyl]-4-yl)-3-(3-ethynylphenyl)-4-phenylcyclopenta-2,4-dien-1-one (3). An oven dried 25 mL Schlenk flask was charged under N$_2$ with 2 (61.3 mg, 0.07 mmol) in anhydrous THF (7 mL). A solution of TBAF (0.76 mL, 0.076 mmol, 0.1 M in THF) was added dropwise to the solution over a period of 5 min at 24° C. The solution was stirred for an additional 10 min and the reaction was quenched with H$_2$O. The suspension was extracted with CH$_2$Cl$_2$ and the organic phase was washed with H$_2$O, dried over Na$_2$SO$_4$ and concentrated on a rotary evaporator. Column chromatography (SiO$_2$; 3:2 hexanes/EtOAc) yielded 3 (23.9 mg, 0.034 mmol, 48%) as a purple solid. $^1$H NMR (500 MHz, CD$_2$Cl$_2$, 22° C.) 5=7.64-7.60 (m, 4H), 7.56-7.50 (m, 8H), 7.41 (dt, J=7.7, 1.2, 1H), 7.35-7.32 (m, 4H), 7.31-7.29 (m, 1H), 7.26-7.18 (m, 3H), 7.14-7.12 (m, 1H), 7.03-6.99 (m, 3H), 5.81-5.80 (m, 2H), 4.14-4.11 (m, 4H), 4.04-4.00 (m, 4H), 3.06 (s, 1H) ppm; $^{13}$C NMR (101 MHz, CD$_2$Cl$_2$, 22° C.) δ=200.7, 155.3, 154.2, 141.8, 141.8, 140.3, 140.1, 138.0, 138.0, 134.3, 133.5, 133.1, 132.7, 131.1, 130.6, 130.3, 130.3, 129.8, 129.3, 128.9, 128.7, 127.6, 127.4, 127.3, 127.3, 127.2, 126.0, 125.4, 122.6, 104.0, 83.3, 78.3, 65.9 ppm; HRMS (ESI-TOF) m/z: [C$_{49}$H$_{36}$O$_5$]' calcd. [C$_{49}$H$_{36}$O$_5$] 704.2557; found 704.2558.

poly-phenylene precursor (4). An oven dried 5 mL sealable tube was charged under N$_2$ with 3 (55.9 mg, 0.079 mmol) in Ph$_2$O (279.5 mg, 0.25 mL). The solution was degassed. The tube was sealed under N$_2$ and heated to 230° C. for 18 h. The solution was cooled to 24° C., MeOH was added, and the precipitate was collected via centrifuge. The precipitate was dissolved in THF and reprecipitated with MeOH (1:2 THF/MeOH) and the resulting precipitate was collected via centrifuge. This process was repeated three times yielding 4 (46.8 mg, 87%) as a colorless solid. $^1$H NMR (400 MHz, CD$_2$Cl$_2$, 22° C.) δ=7.61-7.34 (m, 8H), 7.31-6.50 (m, 18H), 5.83-5.71 (br s, 2H), 4.16-3.89 (m, 8H)

Aldehyde functionalized poly-phenylene (5). A 20 mL vial was charged with 4 (83.1 mg, 0.12 mmol) in CHCl$_3$ (9 mL) under $N_2$. At 24° C. a solution of p-TsOH*$H_2O$ (17.1 mg, 0.09 mmol) in acetone (2 mL) was added dropwise. The solution was stirred at 24° C. for 24 h. The reaction was quenched with saturated $NaHCO_3$ and the organic phase was collected, washed with $H_2O$, saturated aqueous NaCl solution, and dried over $MgSO_4$. The combined organic phases were concentrated and the polymer was precipitated via addition of MeOH. The solid was collected via centrifuge and reprecipitated from THF:MeOH (1:2). The crude polymer (66 mg, 0.10 mmol, 93%) was further purified via preparative GPC ($CHCl_3$), yielding a colorless solid (25.5 mg, 0.04 mmol, 36%) $^1$H NMR (400 MHz, $CDCl_3$, 22° C.) 5=10.06-9.85 (m, 2H), 7.94-7.29 (m, 10H), 7.21-6.45 (m, 16H) ppm.

CHO-cGNR. An oven dried 250 mL Schlenk flask was charged under $N_2$ with 5 (21.6 mg, 0.037 mmol) in anhydrous $CH_2Cl_2$ (120 mL). While sparging with $N_2$, a solution of $FeCl_3$ (352.2 mg, 2.17 mmol, 7 eq. per H) in anhydrous $MeNO_2$ (3.5 mL) was added at 0° C. The reaction mixture was warmed to 24° C. and stirred for 72 h under a continuous stream of $N_2$. The black reaction mixture was quenched with MeOH and filtered over a membrane filter. The precipitate was washed with MeOH and THF. The solid was sonicated in (1:1) toluene/THF, filtered, then washed with THF, acetone, hexanes, ethyl acetate, and acetone yielding a dark purple precipitate CHO-cGNR (21.5 mg, 99%). Raman (powder) $\lambda^{-1}$=253, 1277, 1332, 1603, 2688, 2892, 2942, 3216 $cm^{-1}$.

cGNR-COF thin films. A dispersion of CHO-cGNR (1.349 mg) in (1:1) o-DCB/$CHCl_3$ (4 mL), was added to a solution of benzidine (0.431 mg, 0.002 mmol) in (1:1) o-DCB/$CHCl_3$ (1 mL) and filtered through a pad of glass wool. A silanized vial was charged with the reaction mixture and carefully layered with a 5 mM Sc(OTf)$_3$ (aq.) solution. The vial was left undisturbed for 7 days, during which a gray film began to appear at the interface of the two liquids. The aqueous phase was gently removed by syringe and replaced with $H_2O$. The organic phase was gently removed and replaced with (1:1) o-DCB/$CHCl_3$. The film formed at the interface was scooped onto a substrate. The film was washed by dipping the substrate into water, acetone then isopropyl alcohol.

cGNR-COF film powder. A dispersion of CHO-cGNR (1.349 mg) in (1:1) o-DCB/$CHCl_3$ (4 mL), was added to a solution of benzidine (0.431 mg, 0.002 mmol) in (1:1) o-DCB/$CHCl_3$ (1 mL) and filtered through a pad of glass wool. A silanized vial was charged with the reaction mixture and carefully layered with a 5 mM Sc(OTf)$_3$ (aq.) solution. The vial was left undisturbed for 7 days, during which a gray film began to appear at the interface of the two liquids. The aqueous phase was gently removed by syringe and replaced with $H_2O$. The organic phase was gently removed and replaced with (1:1) o-DCB/$CHCl_3$. A maximum amount of aqueous and organic phase was removed without disturbing the film. The interface suspended film was quickly poured into an excess of acetone. The film suspension was allowed to settle and the majority of the acetone was removed and replaced with fresh acetone. This process was repeated four times and the film dispersion was stored in acetone.

Liquid-phase exfoliation of cGNR-COF films. A dispersion of cGNR-COF films in acetone (2-3 drops) was added to o-DCB (1 mL) and the suspension was sonicated for 15 min. The resulting dispersion was drop-cast onto the desired substrate at 24° C. and the solvent was removed under a stream of $N_2$. The substrate was gently rinsed with water, acetone, isopropyl alcohol, and dried under a stream of $N_2$.

Figure 1B:
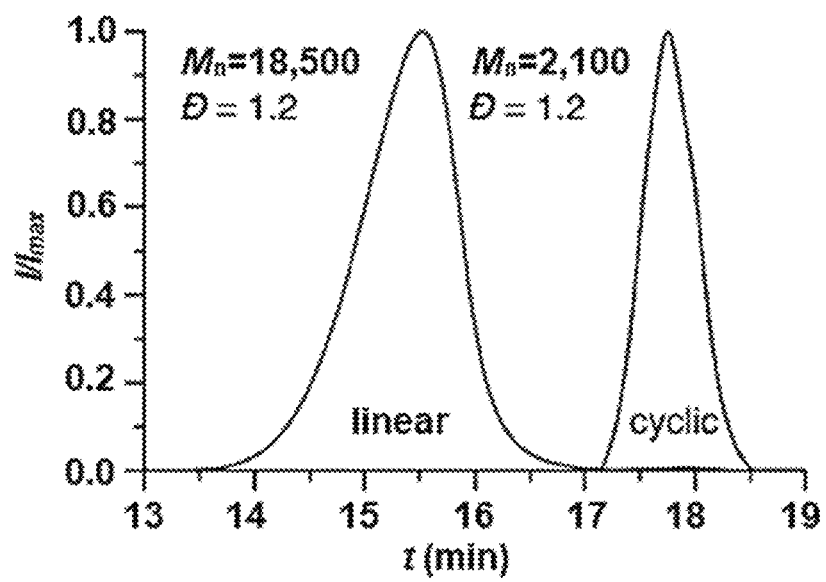
Figure 1C:
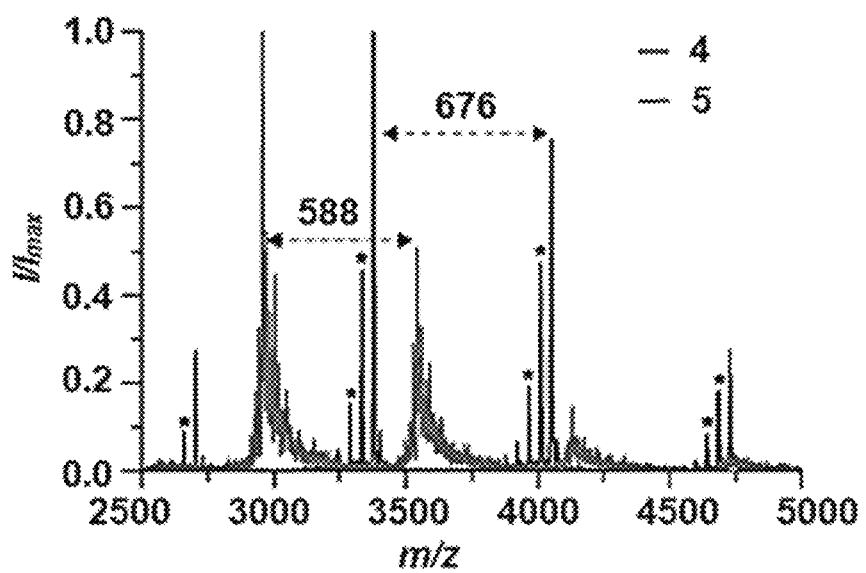
Figure 1D:
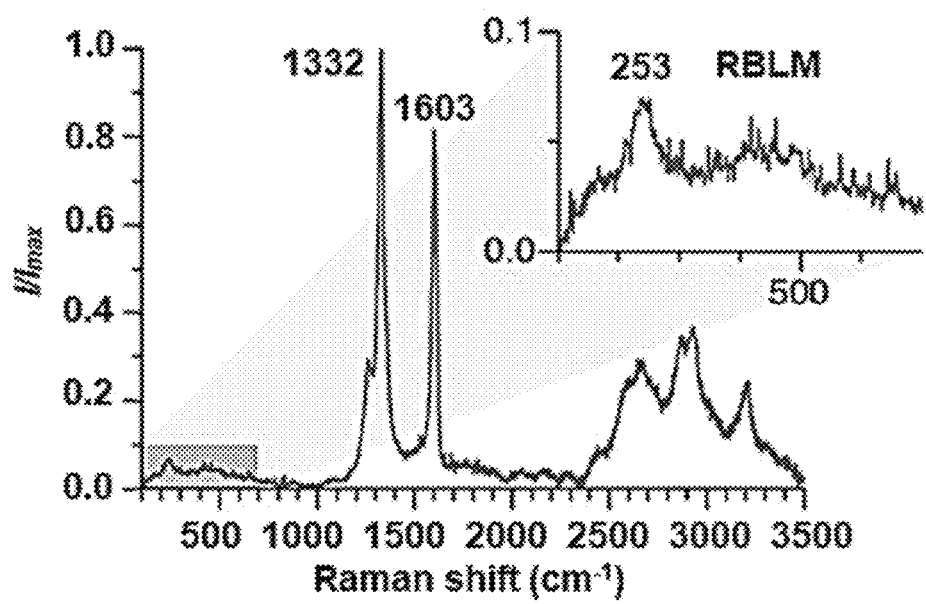
Figure 1E:
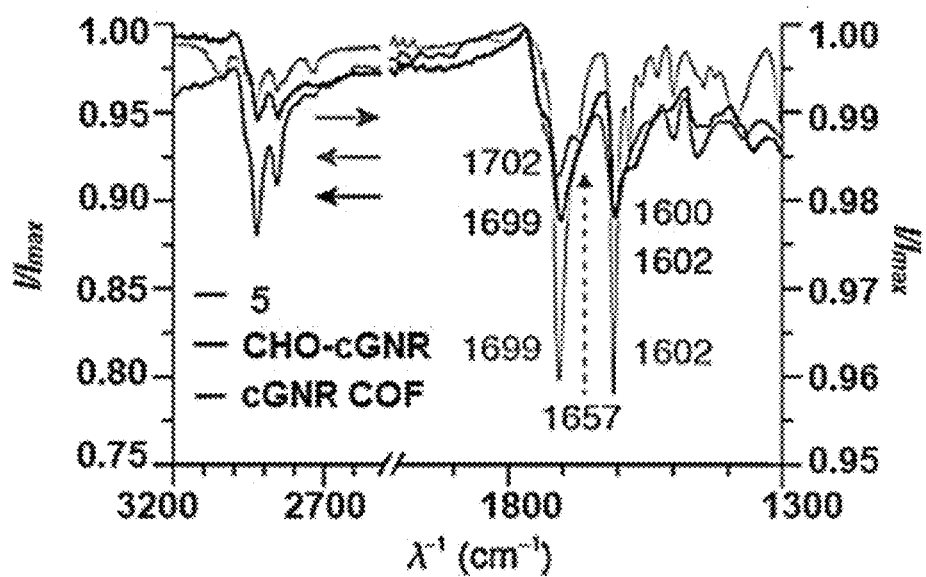
Figure 2:
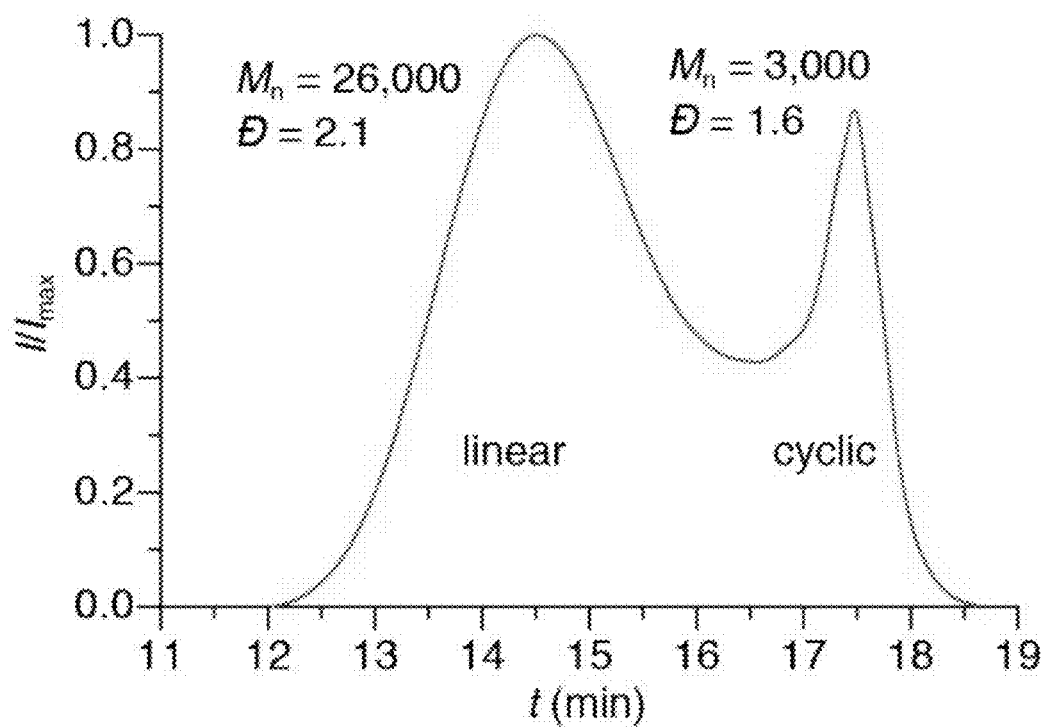
FIG. 2 provides an SEC trace (CHCl$_3$) of crude polyphenylene 4 containing linear polymers and cyclic oligomers.
Figure 3:
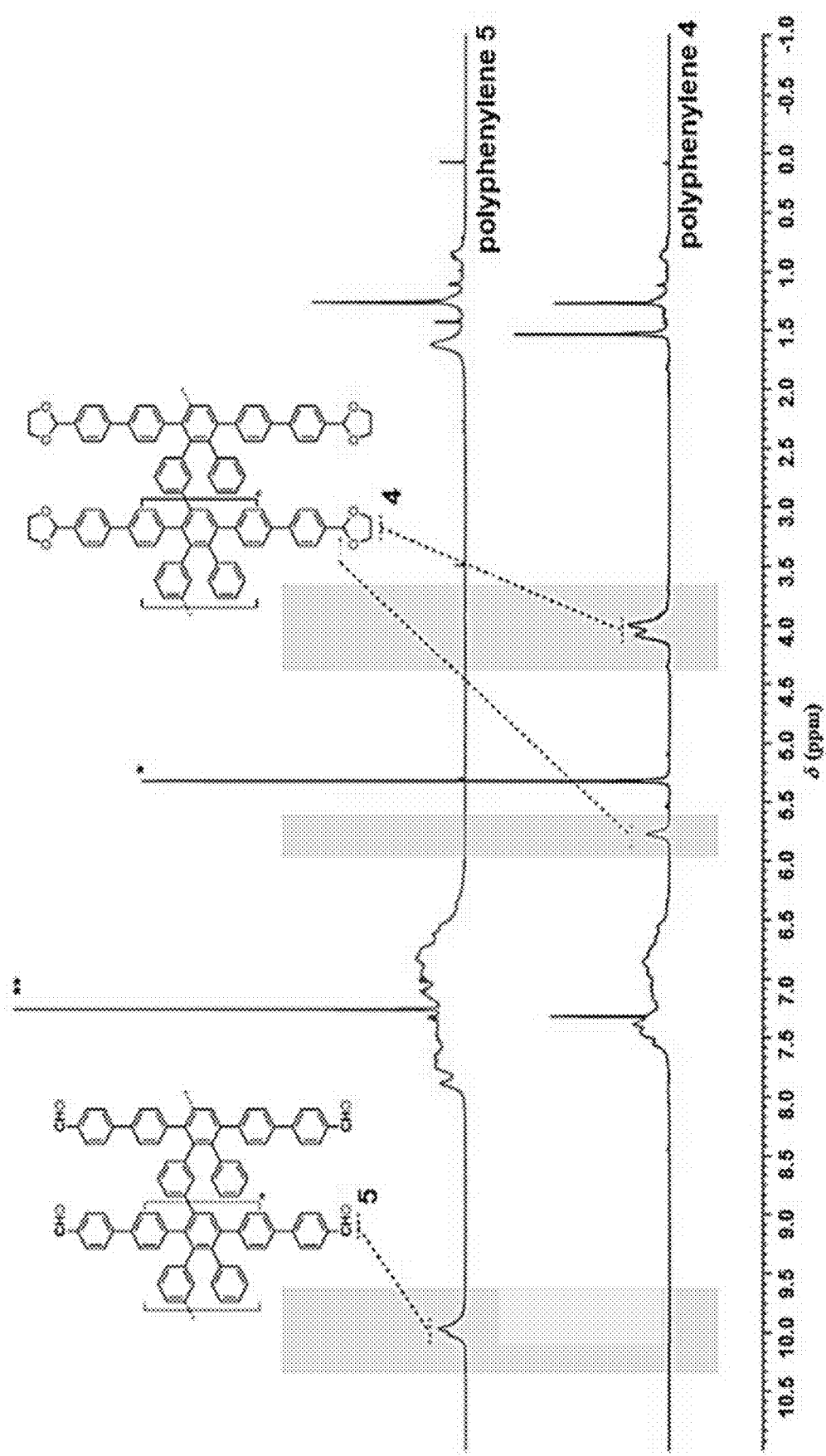
FIG. 3 presents a $^1$H-NMR (400 MHz, CD$_2$Cl$_2$) of polyphenylene 4 (lower plot), and $^1$H-NMR (400 MHz, CDCl$_3$) of polyphenylene 5 (upper plot) following deprotection of the acetal groups. (* residual CH$_2$Cl$_2$, ** residual CHCl$_3$).
Figure 4:
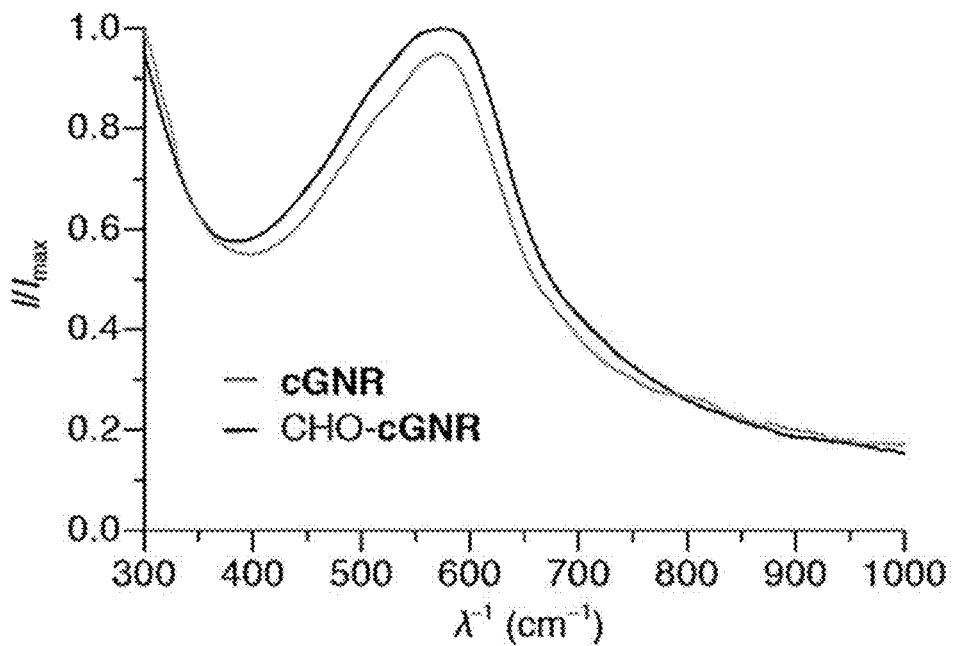
FIG. 4 provides a UV/vis absorption spectrum of unfunctionalized cGNR and CHO-cGNR dispersions in N-methylpyrrolidone (NMP).
Figure 5A:
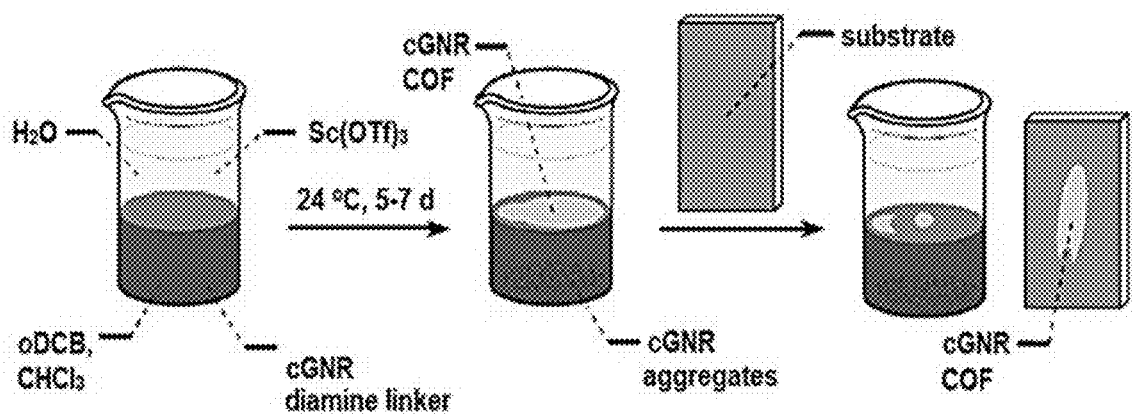
FIG. 5A-E provides for the synthesis and characterization of cGNR-COF thin films. (A) Schematic representation of the interfacial polymerization and scooping/isolating transfer process. (B) Optical microscopy image of a transferred cGNR-COF film on Si/SiO$_2$. Circles correspond to positions where Raman spectra were recorded. (C) Raman spectra ($\lambda_E$=532 nm) of the three regions highlighted in (B). Inset shows the characteristic RLBM. (D) Scanning electron microscopy (5 SEM) image of cGNR-COF film dispersion dropcast onto a TEM grid (5 kV accelerating voltage). (E) Atomic force microscopy (AFM) of ~20 nm cGNR-COF film on HOPG. Film thickness in folded regions corresponds to integer multiples of the single layer film (~40 nm).
Figure 5B:
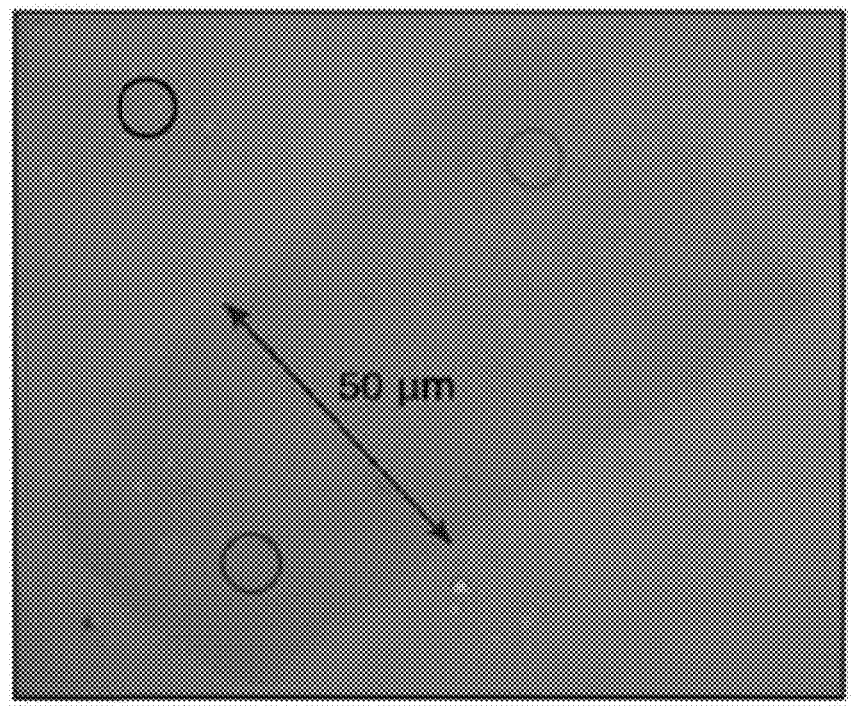
Figure 5C:
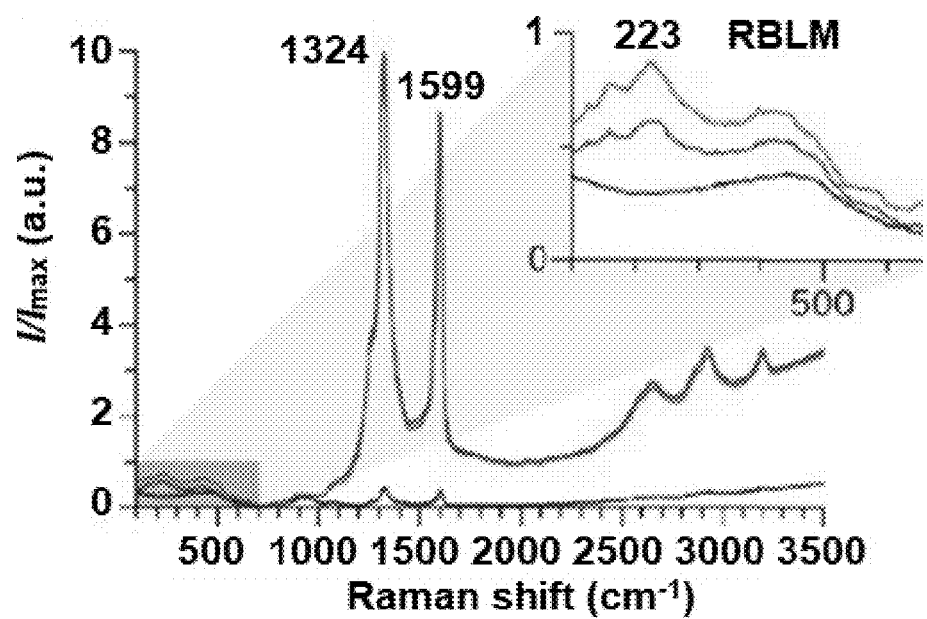
Figure 5D:
Figure 5E:
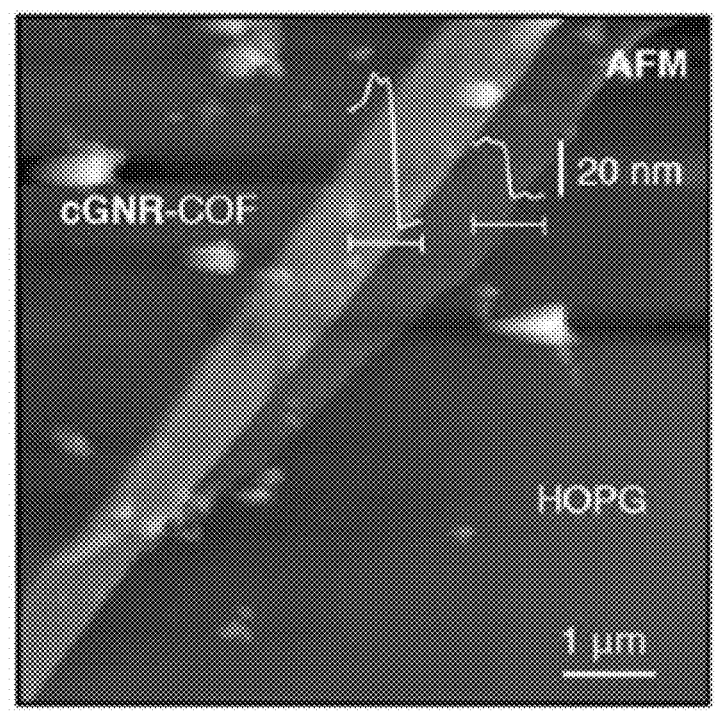

Synthesis of cGNR-COF films. The synthesis of CHO-cGNRs is depicted in FIG. 1A. Diels-Alder polymerization of acetal protected cyclopentadienone 3 yields the poly-phenylene precursor 4. Size exclusion chromatography (SEC) shows a bimodal distribution of linear polymers (Mn=26,000 g $mol^{-1}$) and cyclic oligomers (Mn=3,000 g mol-1) (see FIG. 2) characteristic for a step-growth polymerization mechanism (see Narita et al., *Nat Chem* 6:126-132 (2014) and Narita et al., *ACS Nano* 8:11622-11630 (2014)). Acid catalyzed deprotection of crude 4 yields the aldehyde functionalized poly-phenylene 5. Fractionation of the polymer mixture by preparative SEC gave access to samples 20 of high molecular weight linear polymer 5 ($M_n$=18,500 g $mol^{-1}$) and low molecular weight cyclic oligomers ($M_n$=2,100 g $mol^{-1}$) (see FIG. 1B). MALDI mass spectroscopy of linear polymers 4 and 5 shows families of molecular ions separated by the repeat unit of the polymers, 676 g $mol^{-1}$ and 588 g $mol^{-1}$ for 4 and 5, respectively (see FIG. 1C). The successful deprotection of 4 is further corroborated by the absence of characteristic peaks associated with the acetal protecting group ($\delta$=4.16-3.89 ppm) in $^1$H-NMR spectra of 5 and the appearance of a new peak consistent with the aldehyde group hydrogen atoms ($\delta$=10.06-9.85 ppm) (see FIG. 3). Oxidative cyclodehydrogenation of 5 yields CHO-cGNR as a dark solid. Raman spectra of CHO-cGNRs show the characteristic signatures of cGNRs; a radial breathing like mode (RBLM) (253 $cm^{-1}$), the D (1332 $cm^{-1}$), and the G (1603 $cm^{-1}$) peaks as well as overtone 2D, D+D', and 2D' peaks (see FIG. 1D). An overlay of the respective IR spectra of poly-phenylene 5 and CHO-cGNR confirms the presence of aldehyde groups in the GNRs. The relative intensity of the characteristic aldehyde C=O stretching mode at 1699 $cm^{-1}$, with respect to the C=C stretching mode at 1602 $cm^{-1}$, remains unchanged following the oxidative cyclodehydrogenation (see FIG. 1E). The UV/vis absorption spectrum of aldehyde functionalized CHO-cGNRs, indistinguishable from an original sample of cGNRs featuring solubilizing alkyl chains (see FIG. 4), along with the characteristic Raman spectra (see FIG. 1D), is further evidence that the oxidative cyclodehydrogenation proceeds to the expected high degree of conversion.

Synthesis of cGNR-COF films. Imine cross-linked crystalline cGNR-COFs were grown using a Lewis acid catalyzed interfacial polymerization. The physical separation of the catalyst (Sc(OTf)$_3$), dissolved in an aqueous phase, and the organic building blocks, CHO-cGNRs and the benzidine cross-linker dispersed in an immiscible organic phase, relegate the COF film growth exclusively to the liquid interface. The limited stability of dispersions of CHO-cGNRs in a wide variety of solvents along with the requirement that the density of the organic phase be greater than the aqueous phase to prevent the undesired precipitation of amorphous GNR aggregates at the liquid-liquid interface during film growth, narrowed the selection of organic solvents to mixtures of o-dichlorobenzene (o-DCB) and chloroform. High quality cGNR-COFs were obtained by layering an aqueous solution of Sc(OTf)$_3$ (5 mM) over a homogenous dispersion of CHO-cGNRs and benzidine in o-DCB/$CHCl_3$ (v/v=1:1). Over the course of 5-7 days gray films form at the liquid-liquid boundary that were scooped from the interface and transferred onto solid substrates (see FIG. 5). A series of control experiments that alternately remove any one of the critical components, CHO-cGNRs, benzidine cross-linker, or Sc(OTf)$_3$, from the reaction mixture preclude the formation of cGNRCOFs even after extended reaction times. Similarly, the replacement of CHO-cGNRs with unfunctionalized cGNRs did not lead to the formation of COF films at the liquid-liquid interface (see FIG. 6). It was concluded that the observed cGNR-COF films formed in the presence of both reaction partners, CHO-cGNRs, benzidine, and the Lewis acid catalyst are not comprised of non-covalently assembled films formed at the interface solely driven by n-n interactions. A structural model for cGNR-COF is presented in Table 1:

TABLE 1

Structural Model for cGNR-COF
cGNR-COF
Triclinic, P1̄
a = 5.0000 Å, b = 7.4000 Å, c = 25.5000 Å
α = 100°, β = 90°, γ = 90°

| Atom | x | y | z |
|---|---|---|---|
| C1  | 0.29413  | 0.20248  | 0.04067 |
| C2  | 0.09533  | 0.24133  | 0.08105 |
| C3  | 0.27601  | −0.11706 | 0.04717 |
| C4  | 0.07798  | −0.07794 | 0.08740 |
| C5  | 0.98279  | 0.10117  | 0.10535 |
| C6  | 0.39157  | 0.02167  | 0.02217 |
| C7  | 0.66520  | 0.28812  | 0.16958 |
| N8  | 0.77595  | 0.13195  | 0.14724 |
| C9  | 0.41257  | −0.21965 | 0.41913 |
| C10 | 0.20870  | −0.19678 | 0.45897 |
| C11 | 0.51459  | 0.26045  | 0.39936 |
| C12 | 0.10312  | 0.31701  | 0.47982 |
| C13 | 0.71691  | 0.24226  | 0.35975 |
| C14 | 0.14755  | −0.49083 | 0.27373 |
| C15 | 0.34666  | −0.51776 | 0.23359 |
| C16 | 0.40930  | 0.10956  | 0.41977 |
| C17 | 0.20532  | 0.13903  | 0.45962 |
| C18 | 0.51633  | −0.39740 | 0.39895 |
| C19 | 0.10143  | −0.34471 | 0.48017 |
| C20 | 0.71948  | −0.43134 | 0.35908 |
| C21 | 0.14582  | 0.18477  | 0.27476 |
| C22 | 0.34612  | 0.15797  | 0.23440 |
| C23 | 0.45061  | 0.30667  | 0.21290 |
| C24 | 0.82310  | 0.39154  | 0.33881 |
| C25 | 1.04090  | 0.36140  | 0.29548 |
| C26 | 0.59240  | −0.44461 | 0.57963 |
| C27 | 0.79415  | −0.46851 | 0.54017 |
| C28 | 0.49465  | 0.07002  | 0.59898 |
| C29 | 0.89539  | 0.01188  | 0.52069 |
| H30 | 0.38160  | 0.318,3  | 1.02185 |
| H31 | 1.02333  | 0.38825  | 0.09448 |
| H32 | 0.34191  | −0.26594 | 0.03505 |
| H33 | −0.00948 | −0.19354 | 0.10634 |
| H34 | 0.72846  | 0.42199  | 0.15681 |
| H35 | 1.06905  | −0.34692 | 0.28936 |
| H36 | 0.42831  | −0.39551 | 0.21691 |
| H37 | 0.06465  | 0.06242  | 0.29146 |
| H38 | 0.42528  | 0.01419  | 0.21883 |
| H39 | 0.80250  | 0.10116  | 0.34310 |
| H40 | 0.80779  | −0.31253 | 0.34171 |

Figure 7C:
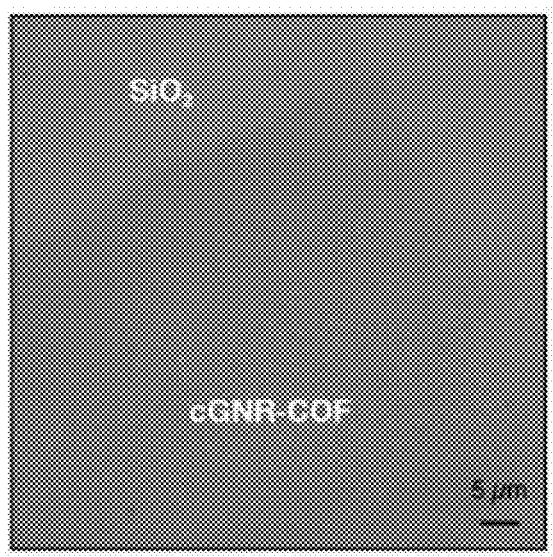
Figure 7D:
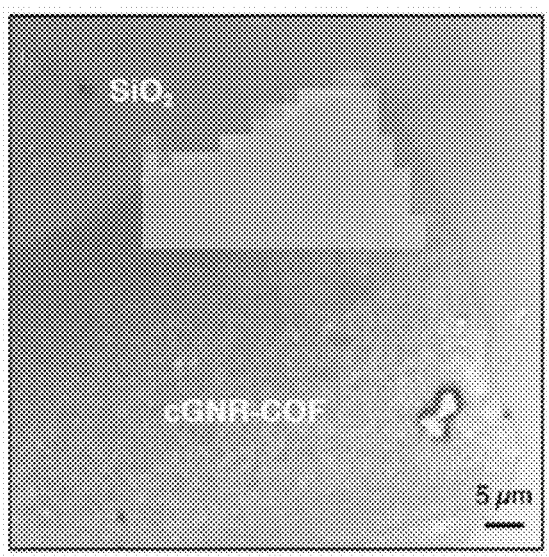

Optical visualization and Raman spectroscopy of CGNR-COF films. Optical microscopy of cGNR-COFs transferred onto a Si/SiO$_2$ surface reveal large flakes (>1000 μm$^2$) of uniform color contrast (see FIG. 5B). Raman spectra recorded at various positions on cGNR-COF films show the characteristic RBLM, D, and G peaks associated with CHO-cGNRs, supporting the structural assignment (see FIG. 5C, blue and red trace). Areas of the SiO$_2$ apparently devoid of cGNR-COFs show only very weak Raman signatures (see FIG. 5C, black trace), attributed to small GNR aggregates or individual ribbons transferred with the solvent during the scooping process. Spatial Raman maps of the G-peak intensity of cGNR-COFs on Si/SiO$_2$ seamlessly coincide with the optical contrast in microscopy images (see FIG. 7). Attenuation of the FT-IR spectra recorded on transferred cGNR-COFs reveal the formation of imine bonds within the film. The FT-IR spectrum of the cGNR-COF, as compared to the CHO-cGNR, shows a decrease in the intensity of the characteristic aldehyde C=O stretching mode ($\lambda^{-1}$=1702 cm$^{-1}$) relative to the C=C mode ($\lambda^{-1}$=1600 cm$^{-1}$) (see FIG. 1E). The imine C=N stretching mode resulting from the cross-linking of CHO-cGNRs with benzidine appears as a new shoulder at $\lambda^{-1}$=1657 cm$^{-1}$ in the IR spectrum of cGNR-COFs (see FIG. 1E).

Figure 8A:
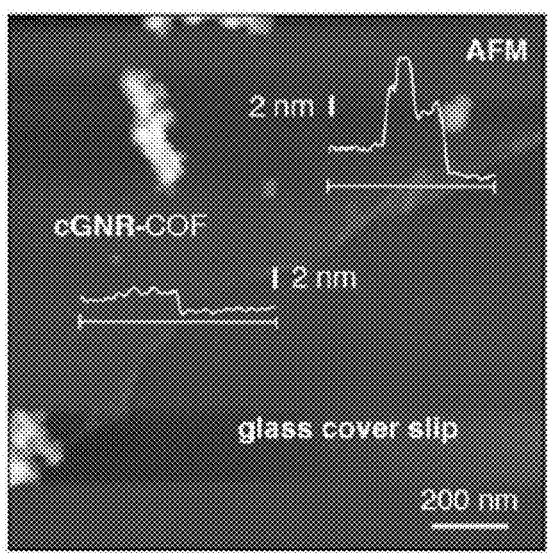
FIG. 8A-B provides ambient AFMs of cGNR-COF films on various substrates. (A) Ambient AFM of cGNR-COF film on a glass cover slip showing homogenous film thickness of ~2 nm. (B) Ambient AFM of cGNR-COF film on HOPG showing homogenous film thickness of ~8 nm.
Figure 8B:
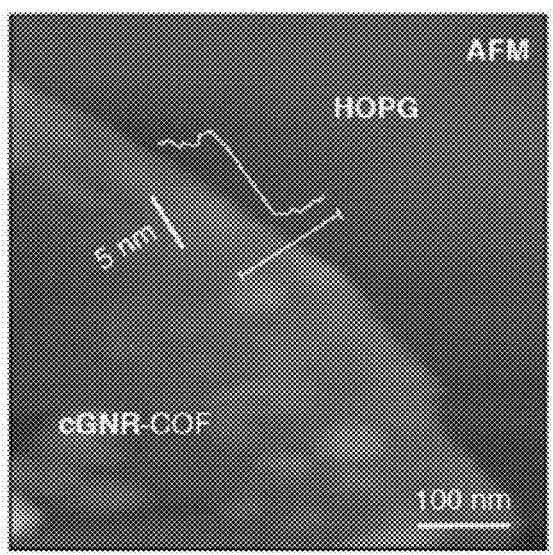
Figure 9:
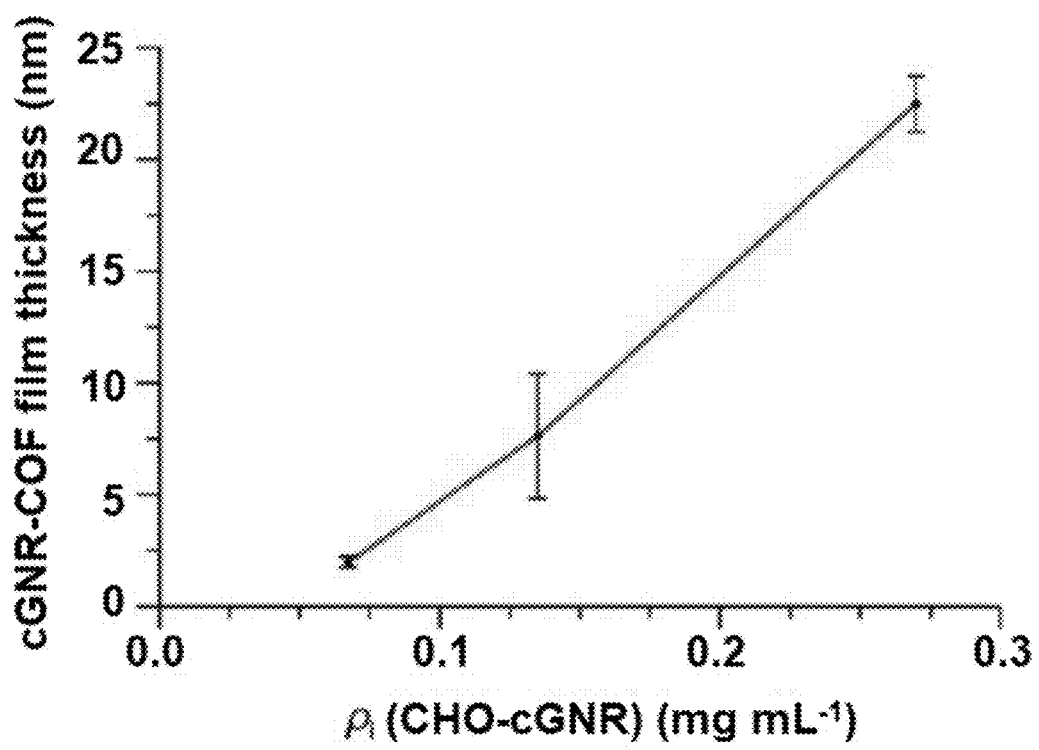
FIG. 9 presents the cGNR-COF film thickness as a function of CHO-cGNR mass concentration (pi); film thicknesses were determined after transfer using ambient AFM.
Figure 10A:
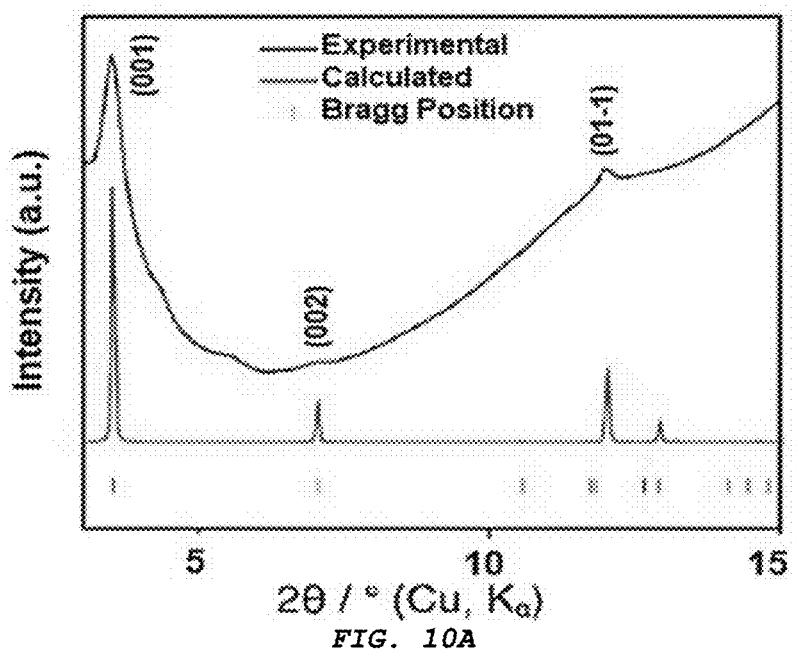
FIG. 10A-E Powder X-ray diffraction and HR-TEM of cGNR-COF thin films. (A) Experimentally and theoretically calculated WAXS pattern of powdered sample of cGNR-COF film. (B) Structural model of cGNR-COF with unit cell (black box), orientation displaying lattice plane (01-1) corresponding to distance between linkers (0.7 nm) (top), orientation displaying interlayer packing and lattice planes (001), (002), and (105) corresponding to 2.5 nm, 1.25 nm, and 0.35 nm (bottom). (C) SEM image of cGNR-COF film from HR-TEM sample. (D) HR-TEM image of cGNR-COF crystallite displaying the (01-1) plane, fringes separated by 0.7 nm (white marker), Fourier diffractogram of the highlighted region (inset, scale bar 5 nm$^{-1}$). (E) HR-TEM image of cGNR-COF crystallite displaying the (105) plane, fringes represent Π-Π-stacking (0.35 nm) within the film, Fourier diffractogram of the highlighted region (inset, scale bar 5 nm$^{-1}$).
Figure 10B:
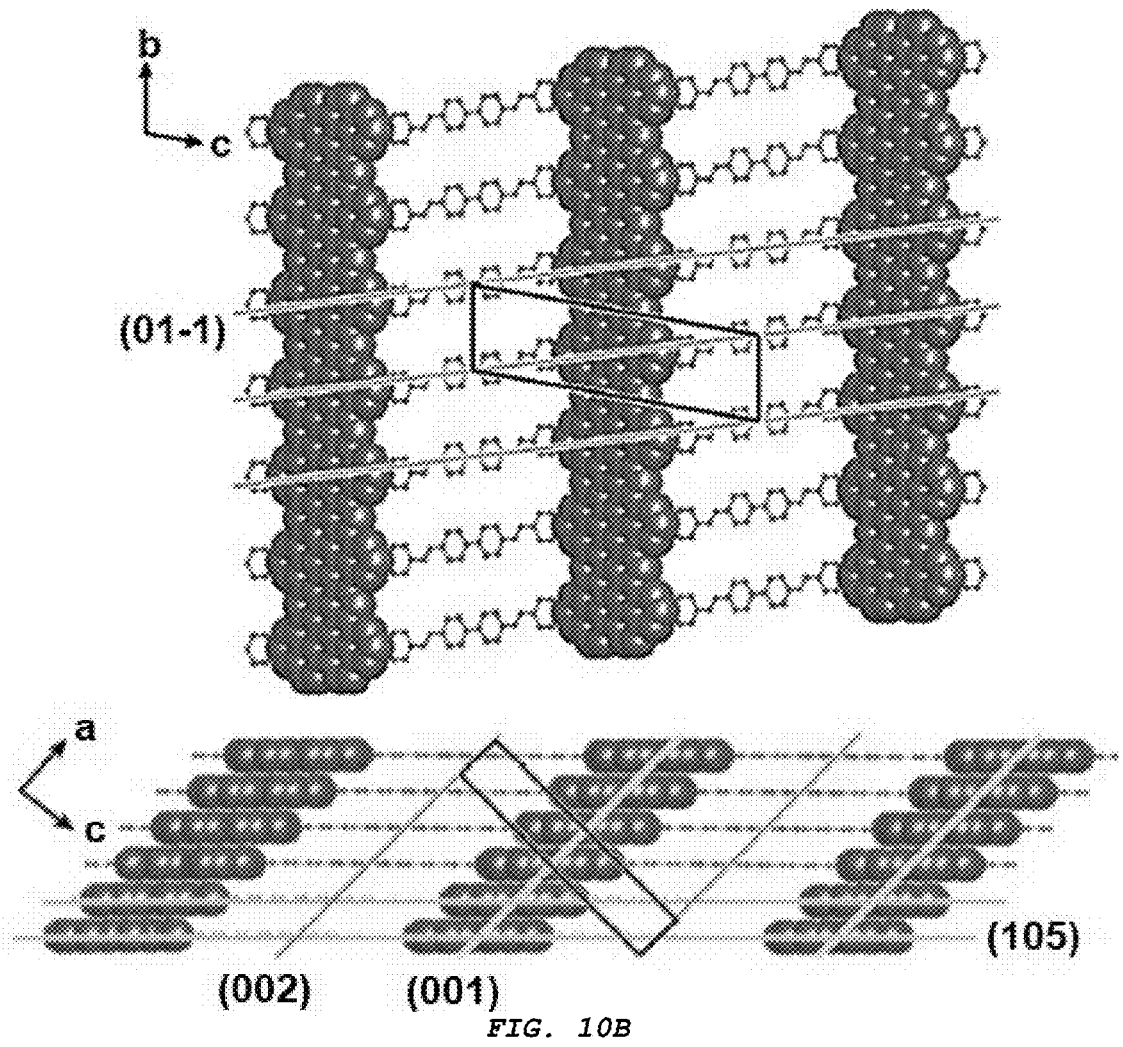

Electron microscopy visualization of cGNR-COF films. cGNR-COF film morphology and thickness were examined using scanning electron microscopy (SEM) and atomic force microscopy (AFM). SEM images of cGNR-COF films transferred onto TEM grids show large-scale homogeneity and well-defined film morphology (see FIG. 5D). Large areas (>100 μm$^2$) of homogenous, smooth films show little to no amorphous regions or protrusions from the surface (see FIG. 5D). This is further supported by ambient AFM that shows films with height profiles ranging from 2-20 nm (see FIG. 5E, FIG. 8). The thickness of cGNR-COF films prepared through Lewis acid catalyzed growth at the liquid-liquid interface scales linearly with the initial concentration of CHO-cGNRs (see FIG. 9). Dilute dispersions of CHO-cGNRs (67 μg mL$^{-1}$) yield film thicknesses as low as 2 nm while higher concentrations (270 μg mL$^{-1}$) form films with average thicknesses in excess of 20 nm. Synchrotron X-ray scattering was used to study the crystallographic structure of cGNR-COF films. FIG. 10A shows the projected trace of the wide-angle X-ray scattering (WAXS) pattern of powdered samples of cGNR-COFs grown at the liquid-liquid interface. The data was collected by suspending a dried, powdered sample of cGNR-COFs in a quartz capillary perpendicular to the incident beam. The WAXS pattern shows three characteristic reflections at 2q=3.5°, 7.0°, and 12.0° corresponding to d-spacings of 2.5 nm, 1.2 nm, and 0.7 nm, respectively (see FIG. 10A). A structure model for the packing of cGNR-COF constructed in the triclinic space group P-1 with unit cell parameters a=5.0 Å, b=7.4 Å, c=25.5 Å, a=100°, b=90°, and g=90° is depicted in FIG. 10B. The predicted diffraction pattern is in good agreement with experimental data. The observed reflections at 2.5 nm, 1.2 nm, and 0.7 nm were assigned to the (001), (002), and (01-1) planes, respectively (FIG. 10A). The (001) and (002) Bragg reflections correspond to the distance, and half the distance, between parallel ribbons (2.5 nm and 1.25 nm) whereas the (01-1) corresponds to the spacing of benzidine linkers (0.7 nm) lining the edges of the cGNRs (see FIG. 10B). The Bragg reflections associated with the interlayer Π-stacking between cGNRs is masked by the pronounced background of the quartz capillary in the expected region of the WAXS pattern.

Figure 10C:
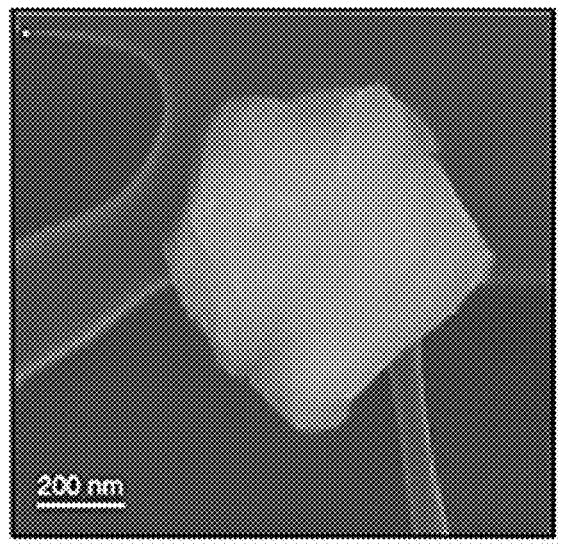
Figure 10D:
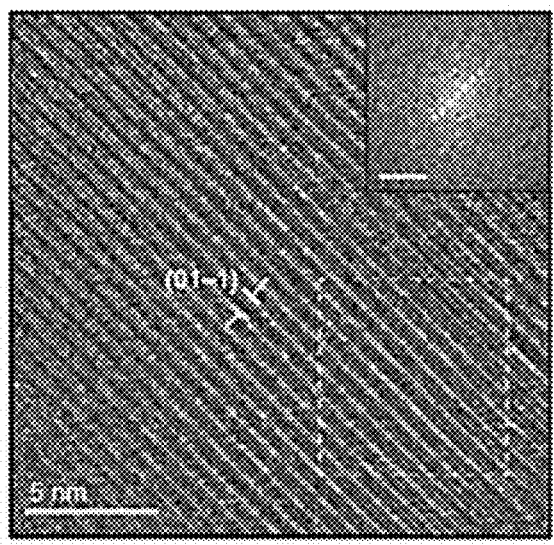
Figure 10E:
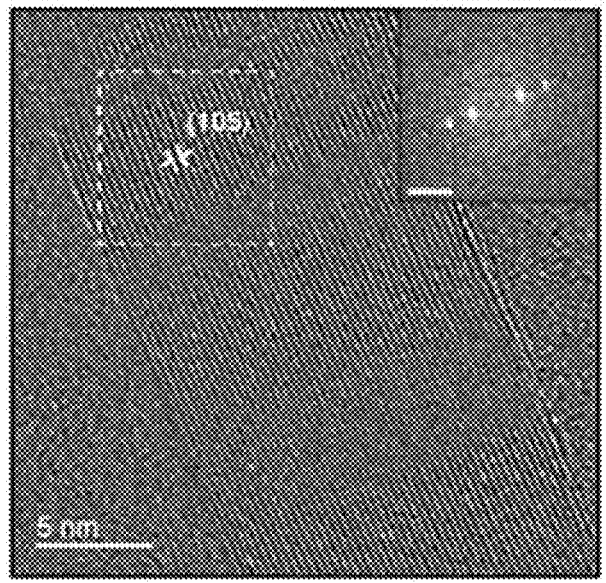

A high-resolution transmission electron microscopy (HR-TEM) was used to study the crystalline domain size of cGNR-COF films directly scooped from the liquid-liquid interphase (see FIG. 10C). The micrographs, recorded at a total electron dose of 100 e Å$^{-2}$ to minimize sample damage, display clear lattice fringes corresponding to the distance between linkers (0.7 nm) (see FIG. 10D) and the π-stacking between ribbons (0.35 nm) (see FIG. 10E), respectively. The observed lattice fringes corroborate the molecular model depicted in FIG. 10B and can be assigned to the (01-1) and (105) lattice planes, respectively. The fact that the (001) and (002) planes related to the distance between covalently linked cGNRs cannot be observed in the TEM images is attributed to a preferential orientation of the crystallites within the film relative to the TEM grid. Following the scooping transfer the cGNR-COFs adopt orientations in which the lateral spacing between cGNRs (2.5 nm) lies on an axis perpendicular to the surface and remains out of focus leaving only the n-stacking and linker-linker distances to be observed by in-plane elastic scattering. Most notably, the HR-TEM demonstrates that the crystalline domain size (>400 nm²) is 1-2 orders of magnitude larger than previously reported solution processable GNR films formed via π-stacking alone. cGNR-COFs not only self-assemble into larger crystallites but macromolecular reticulation through directional covalent bonds allows for the rational design of highly anisotropic materials.

Figure 11A:
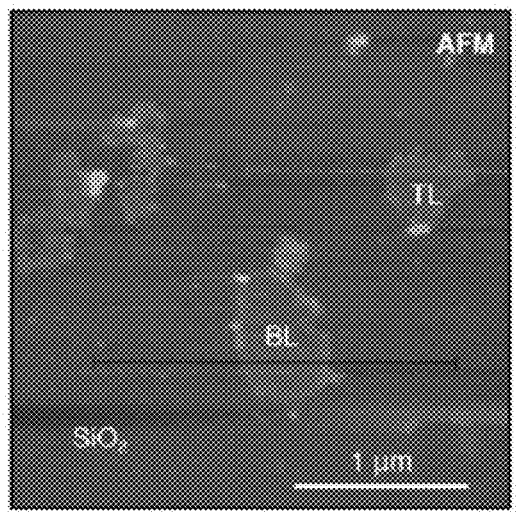
FIG. 11A-D presents a chemically exfoliated bilayer and trilayer cGNR-COF flakes on SiO$_2$ substrates. (A-B) AFM topographic images of liquid-phase exfoliated cGNR-COF on SiO$_2$. (C-D) AFM z-height profiles along the lines depicted in A, B. Averaged background and averaged plateau height (black dashed lines), spacing corresponding to interlayer Π-Π-stacking distance (Δ=0.35 nm) as determined via HR-TEM and diffraction models (grey dotted lines).
Figure 11B:
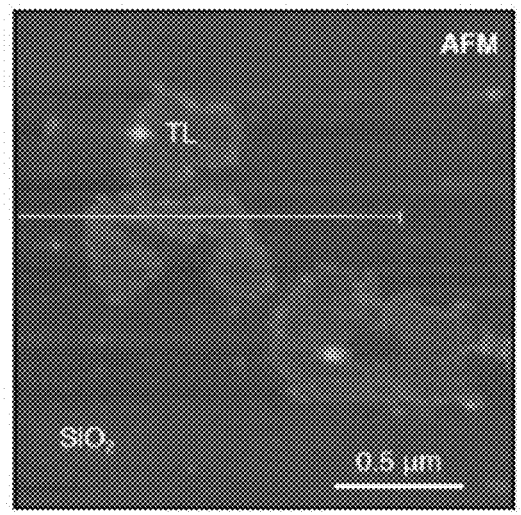
Figure 11C:
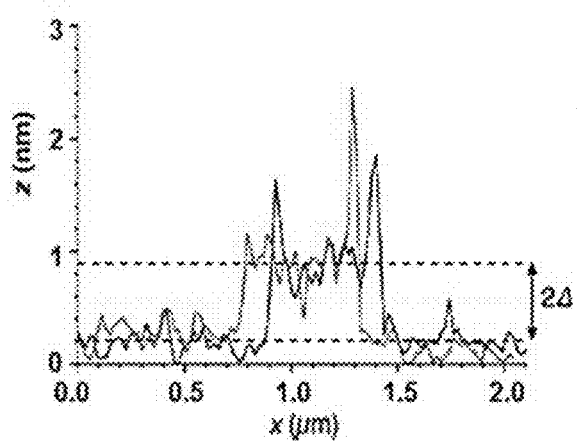
Figure 11D:
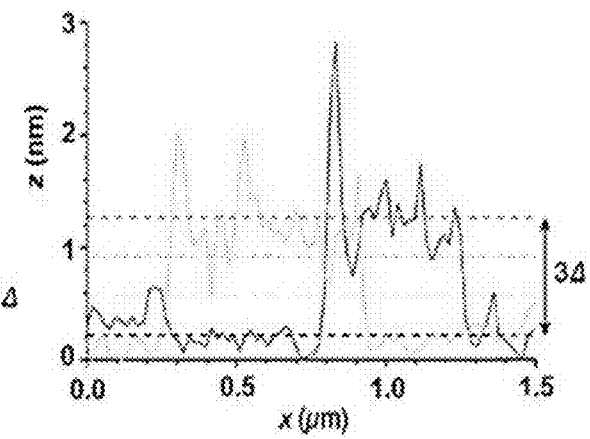
Figure 12:
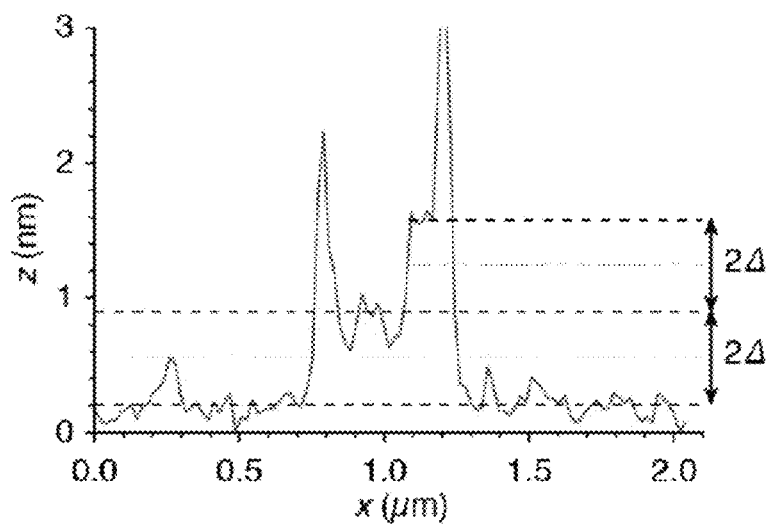
FIG. 12 presents an AFM topographic trace of liquid-phase exfoliated cGNR-COF on SiO$_2$. z-height profile shows a step-edge transition from a bilayer to a tetralayer flake.

Finally, adopting a liquid-phase exfoliation protocol for the delamination of crystalline 2D COFs, allowed for the access of free-standing few-layer 2D cGNR-COF sheets. A dispersion of multilayer films grown from a saturated CHO-cGNR solution in acetone was transferred to o DCB, sonicated, and drop-cast onto Si/SiO₂. The resulting cGNR-COF flakes were analyzed using ambient AFM to determine the film thickness, size, and homogeneity (FIGS. 11A and B). The lateral dimensions of the cGNR-COF flakes are >105 nm² and range in thickness between 0.70 nm (FIG. 11C) and 1.05 nm (FIG. 11D), corresponding to bilayer and trilayer stacks of 2D cGNR-COF sheets (Π-Π-stacking distance 4=0.35 nm). Some exfoliated films exhibit layered height profiles commensurate with step-edges within a single flake (see FIG. 12). The orthotropic crystal packing adopted by GNRs in 2D COF films represents a unique opportunity to enhance the chemical, physical, and optoelectronic properties of COFs by independently tuning the mechanical and electrical material properties along all three axes of the crystal lattice.

A number of embodiments have been described herein. Nevertheless, it will be understood that various modifications may be made without departing from the spirit and scope of this disclosure. Accordingly, other embodiments are within the scope of the following claims.

What is claimed is:

1. A crystalline graphene nanoribbon-covalent organic framework (GNR-COF) comprising:
   a plurality of graphene nanoribbons (GNRs) that are connected or linked together by a plurality of organic linking ligands;
   wherein one or more functional groups are located along edges and in a plane of the plurality of GNRs such that the plurality of GNRs comprise a structure of:

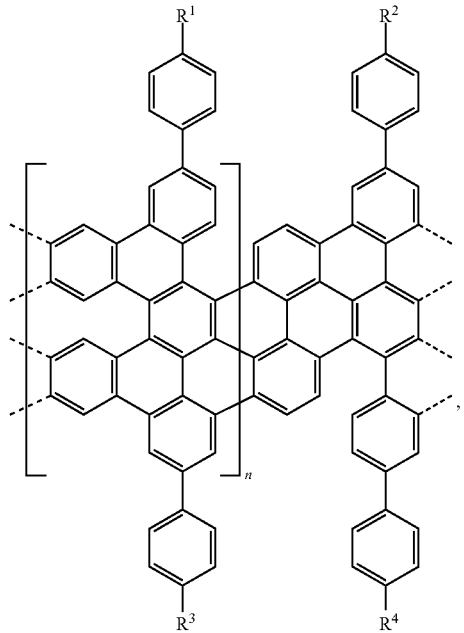

wherein
   $R^1$-$R^4$ are each individually selected from —CHO, —CN, or —B(OH)$_2$; and
   n is an integer>100, and
   wherein the one or more functional groups of the GNRs form covalent bonds with a plurality of organic linking ligands.

2. The GNR-COF of claim 1, wherein the GNR-COF has an anisotropic crystalline structure.

3. The GNR-COF of claim 1, wherein the GNR-COF has a two-dimensional (2D) sheet or film morphology.

4. The GNR-COF of claim 3, wherein the GNR-COF has a film thickness from 0.5 nm to 50 nm.

5. The GNR-COF of claim 4, wherein the GNR-COF has a film thickness from 2 nm to 25 nm.

6. The GNR-COF of claim 1, wherein the GNR-COF has been delaminated into bilayer and/or trilayer GNF-COF flakes.

7. The GNR-COF of claim 1, wherein the GNRs comprises atomically spaced functional groups along edges of the plurality of GNRs.

8. The GNR-COF of claim 1, wherein the plurality of graphene nanoribbons (GNRs) form covalent bonds with the organic linking ligands via a Schiff base reaction, a boronate ester formation reaction, a Knoevenagel reaction, an imide formation reaction, a Michael addition reaction, a phenazine formation reaction, a squaraine formation reaction, or a benzoxazole formation reaction.

9. The GNR-COF of claim 1, wherein $R^1$-$R^4$ is —CHO.

10. The GNR-COF of claim 1, wherein precursors of the plurality of organic linking ligands have a structure selected from:

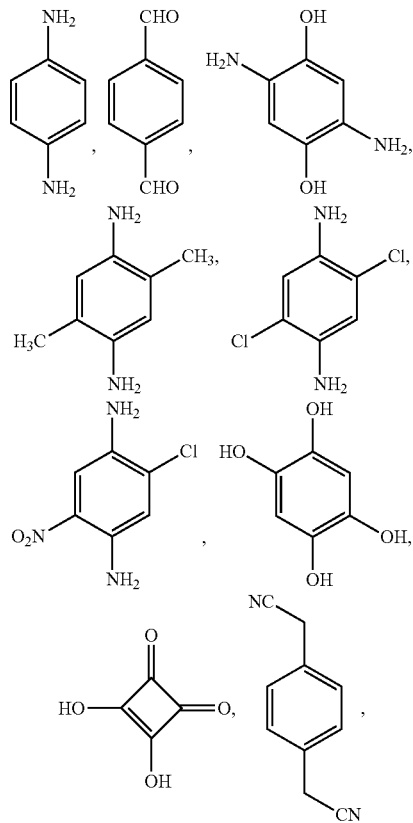

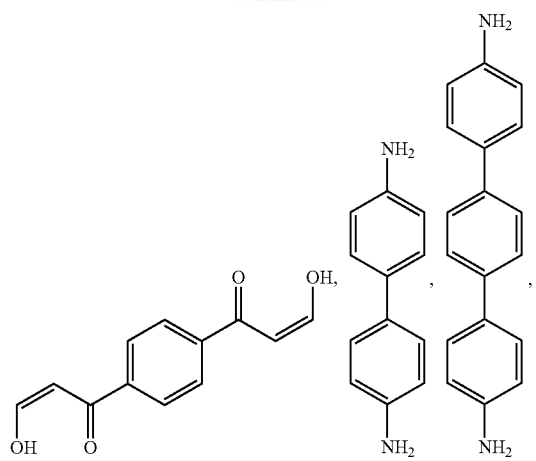
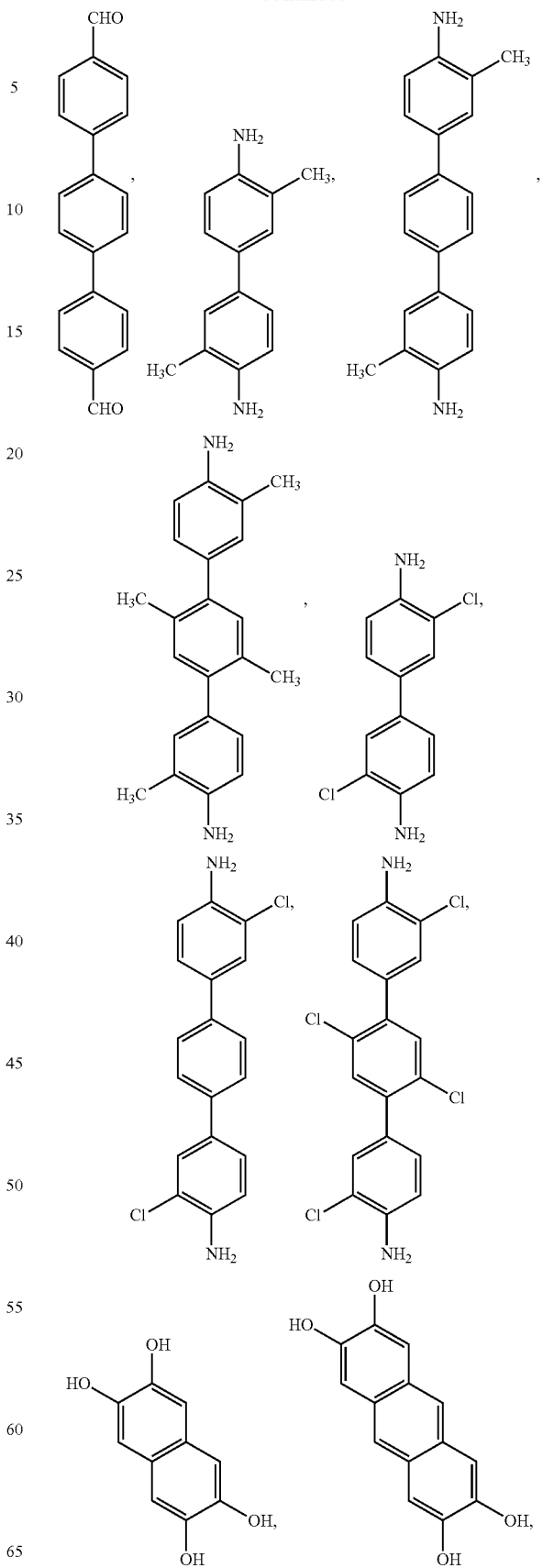

-continued

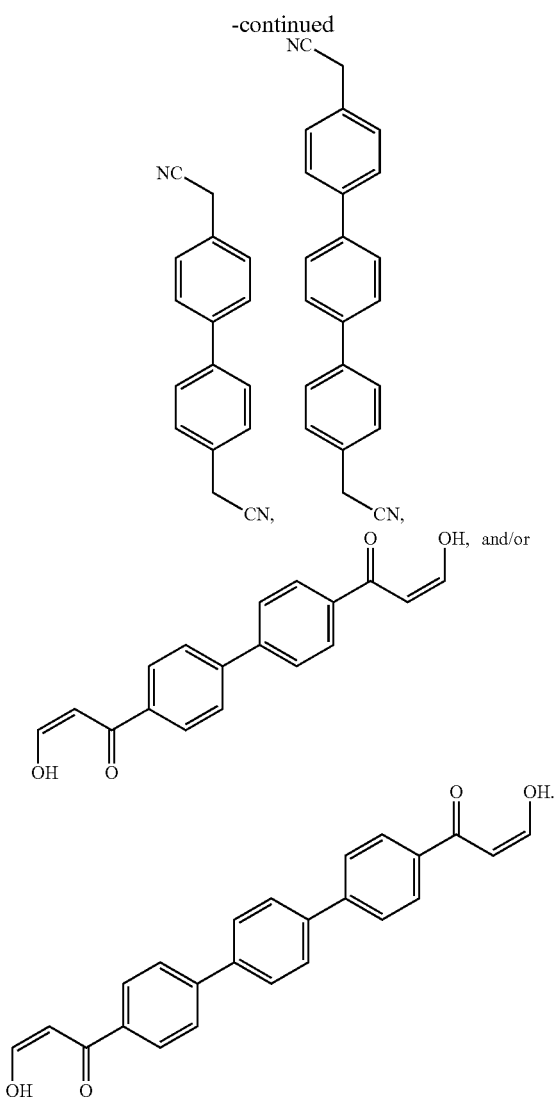

OH, and/or

11. The GNR-COF of claim 10, wherein precursors of the plurality of organic linking ligands have the structure of:

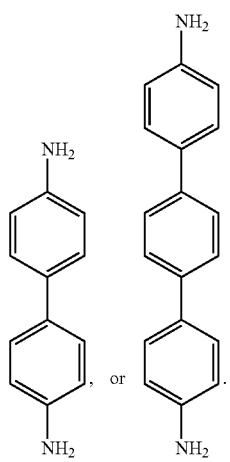 [SMILES: Nc1ccc(-c2ccc(N)cc2)cc1 ; Nc1ccc(-c2ccc(-c3ccc(N)cc3)cc2)cc1]

12. A method of making the crystalline GNR-COF of claim 1, comprising:
adding a first mixture comprising a Lewis Acid and/or Bronsted acid in an aqueous solution, with a second mixture comprising a plurality of graphene nanoribbons (GNRs) and a plurality of organic liking ligands in an organic solvent system;
wherein the GNR-COF is formed through interfacial polymerization at a liquid interface between the first mixture and the second mixture.

* * * * *